United States Patent
Yasuda et al.

(10) Patent No.: US 9,610,871 B2
(45) Date of Patent: Apr. 4, 2017

(54) VEHICLE SEAT

(71) Applicant: NHK SPRING CO., LTD., Yokohama-shi (JP)

(72) Inventors: Kenzo Yasuda, Yokohama (JP); Hiroshi Kushiku, Yokohama (JP)

(73) Assignee: NHK SPRING CO., LTD., Yokohama-Shi (JP)

( * ) Notice: Subject to any disclaimer, the term of this patent is extended or adjusted under 35 U.S.C. 154(b) by 0 days.

(21) Appl. No.: 14/741,325

(22) Filed: Jun. 16, 2015

(65) Prior Publication Data

US 2015/0367762 A1  Dec. 24, 2015

(30) Foreign Application Priority Data

Jun. 24, 2014 (JP) ................................ 2014-129583

(51) Int. Cl.
| | |
|---|---|
| A47C 7/02 | (2006.01) |
| B60N 2/427 | (2006.01) |
| B60N 2/68 | (2006.01) |
| B60N 2/70 | (2006.01) |
| B60N 2/42 | (2006.01) |
| B60N 2/48 | (2006.01) |

(52) U.S. Cl.
CPC ....... B60N 2/42745 (2013.01); B60N 2/4228 (2013.01); B60N 2/42709 (2013.01); B60N 2/48 (2013.01); B60N 2/68 (2013.01); B60N 2/686 (2013.01); B60N 2/7094 (2013.01)

(58) Field of Classification Search
CPC ............. B60N 2/42475; B60N 2/4228; B60N 2/42709; B60N 2/686; B60N 2/7094

USPC ............ 297/452.18, 452.49, 452.53, 452.54, 297/216.13, 216.14
See application file for complete search history.

(56) References Cited

U.S. PATENT DOCUMENTS

| | | | | |
|---|---|---|---|---|
| 5,490,718 A | * | 2/1996 | Akizuki ................. | B60N 2/507 297/452.18 |
| 5,509,716 A | * | 4/1996 | Kolena ................. | B60N 2/4228 297/216.1 |
| 5,558,398 A | * | 9/1996 | Santos ..................... | A47C 4/54 297/284.3 |

(Continued)

FOREIGN PATENT DOCUMENTS

JP  2009-107571  5/2009

*Primary Examiner* — Laurie K Cranmer
(74) *Attorney, Agent, or Firm* — Knobbe Martens Olson & Bear LLP

(57) ABSTRACT

A vehicle seat includes: a seatback frame of a resin-formed seatback, including a plate-shaped back face panel portion; a headrest; a seatback pad; a lattice-shaped spring member formed from wire arranged in a lattice shape, attached to the seatback frame at a front side of the back face panel portion, and that resiliently supports the seatback pad from a rear side, with a space formed between the back face panel portion and the lattice-shaped spring member; and a load transmission section provided at one of the lattice-shaped spring member or the back face panel portion and disposed inside the space so as to project out toward the side of the other one of the lattice-shaped spring member or the back face panel portion, such that a gap is formed between the load transmission section and the other one of the lattice-shaped spring member or the back face panel portion.

3 Claims, 21 Drawing Sheets

(56) References Cited

U.S. PATENT DOCUMENTS

| | | | | |
|---|---|---|---|---|
| 5,769,489 A * | 6/1998 | Dellanno | ............. | B60N 2/4228 |
| | | | | 297/216.12 |
| 6,062,642 A * | 5/2000 | Sinnhuber | ............ | B60N 2/4228 |
| | | | | 297/216.1 |
| 6,585,318 B1 * | 7/2003 | Tak | ........................ | B60N 2/527 |
| | | | | 297/216.1 |
| 8,172,320 B2 * | 5/2012 | Kalinowski | .......... | B60N 2/4228 |
| | | | | 297/216.1 |
| 8,662,483 B2 * | 3/2014 | Yamaguchi | ............ | B60N 2/002 |
| | | | | 267/102 |
| 8,690,255 B2 * | 4/2014 | Yamaki | ................ | B60N 2/4228 |
| | | | | 297/216.14 |
| 9,126,504 B2 * | 9/2015 | Line | ..................... | B60N 2/4838 |
| 2007/0085390 A1 * | 4/2007 | Kawashima | ....... | B60N 2/42745 |
| | | | | 297/216.13 |
| 2009/0108646 A1 * | 4/2009 | Chida | .................. | B60N 2/4228 |
| | | | | 297/216.13 |
| 2009/0152929 A1 * | 6/2009 | Sung | ........................ | B60N 2/68 |
| | | | | 297/452.18 |
| 2011/0043008 A1 * | 2/2011 | Reel | ..................... | B60N 2/4228 |
| | | | | 297/216.13 |
| 2013/0119742 A1 * | 5/2013 | Wiegelmann | ............ | B60N 2/54 |
| | | | | 297/452.18 |
| 2015/0314501 A1 * | 11/2015 | Maslakow | ........ | B29C 45/14786 |
| | | | | 297/452.18 |

* cited by examiner

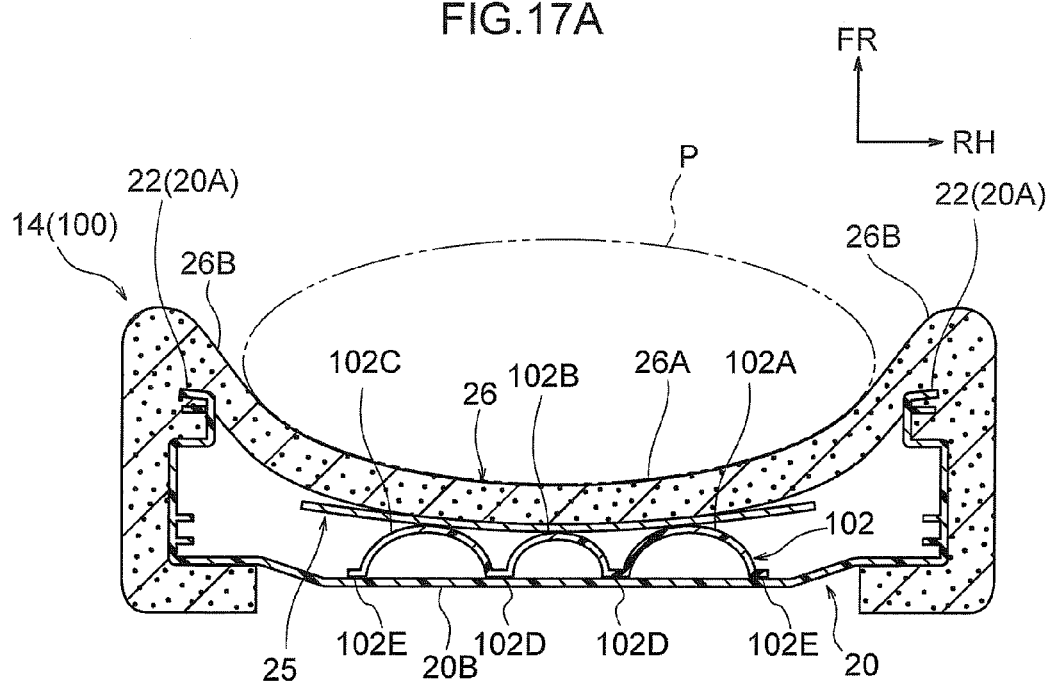
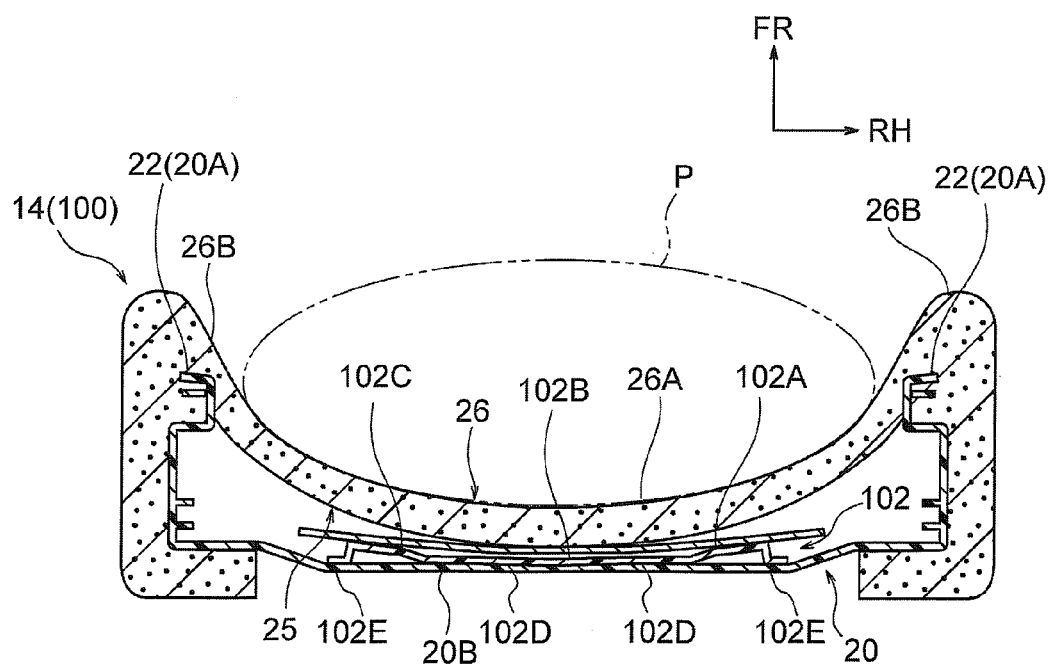

VEHICLE SEAT

CROSS-REFERENCE TO RELATED APPLICATION

This application claims priority under 35 USC 119 from Japanese Patent Application No. 2014-129583 filed on Jun. 24, 2014, the disclosure of which is incorporated by reference herein.

BACKGROUND OF THE INVENTION

Field of the Invention

The present invention relates to a vehicle seat.

Related Art

In a vehicle seat described in Japanese Patent Application Laid-Open (JP-A) No. 2009-107571, a pad member (seatback pad) of a seatback is supported from the seat rear side by a plane spring structure (lattice-shaped spring member). The lattice-shaped spring member is formed by wires arranged in a lattice shape, and is coupled to a seatback frame by connecting wires. The lattice-shaped spring member resiliently supports the seatback pad from the seat rear side, thereby enabling the comfort (ride comfort) of a seated occupant to be secured during normal operation.

In the event of a collision from the rear (rear collision), load from the seated occupant moving toward the seat rear side under inertia is input to the lattice-shaped spring member, releasing the coupled state between the lattice-shaped spring member and the connecting wires, or the coupled state between the connecting wires and the seatback frame. The back and lumbar of the seated occupant accordingly enter the seatback, and the head of the seated occupant is swiftly supported by a headrest. Whiplash injury can accordingly be reduced, contributing to an improvement in occupant protection performance.

Recently, some seatback frames are being formed entirely out of resin, with the intention, for example, of reducing the weight of the vehicle seat. Improvements in occupant protection performance in the event of a rear collision, while securing the comfort of the seated occupant during normal operation, are also demanded in vehicle seats provided with such resin seatback frames.

SUMMARY

In consideration of the above circumstances, the present invention provides a vehicle seat that contributes to an improvement in occupant protection performance in the event of a rear collision, while securing the comfort of a seated occupant during normal operation, in a configuration provided with a resin seatback frame.

A first aspect of the present invention is a vehicle seat including: a seatback frame that configures a frame of a resin-formed seatback, and that includes a plate-shaped back face panel portion disposed at a back face of the seatback; a headrest that is provided at an upper end of the seatback; a seatback pad that is provided at a front side of the seatback frame; a lattice-shaped spring member that is formed from wire arranged in a lattice shape, that is attached to the seatback frame at a seat front side of the back face panel portion, and that is configured to resiliently support the seatback pad from a seat rear side, with a space formed between the back face panel portion and the lattice-shaped spring member; and a load transmission section that is provided at one of the lattice-shaped spring member or the back face panel portion and is disposed inside the space so as to project out toward the side of the other one of the lattice-shaped spring member or the back face panel portion, such that a gap is formed between the load transmission section and the other one of the lattice-shaped spring member or the back face panel portion.

In the first aspect, the resin-formed seatback frame configuring the frame of the seatback includes the back face panel portion disposed at the back face of the seatback. The lattice-shaped spring member that is formed from wire arranged in a lattice shape is attached to the seatback frame, and the lattice-shaped spring member resiliently supports the seatback pad from the seat rear side. A space is formed between the lattice-shaped spring member and the back face panel portion, and the load transmission section is disposed inside the space. The load transmission section is provided at one of the lattice-shaped spring member or the back face panel portion so as to project out toward the other one of the lattice-shaped spring member or the back face panel portion, such that a gap is formed between the load transmission section and the other one of the lattice-shaped spring member or the back face panel portion. This gap permits resilient deformation of the lattice-shaped spring member and the seatback pad toward the seat rear side, enabling the comfort of a seated occupant to be secured during normal operation.

In the event of a rear collision, the seated occupant moving toward the seat rear side under inertia inputs an excess load to the lattice-shaped spring member through the seatback pad, such that the lattice-shaped spring member moves relatively closer to the back face panel portion. The back and lumbar of the seated occupant can accordingly enter the seatback, thereby enabling the head of the seated occupant to be swiftly supported by the headrest. Moreover, when the load transmission section is squeezed between the lattice-shaped spring member and the back face panel portion due to them moving closer as described above, load from the seated occupant is transmitted to the back face panel portion. The back and lumbar of the seated occupant are accordingly supported by the back face panel portion of the seatback frame. A contribution is accordingly made to improving occupant protection performance in the event of a rear collision.

In the first aspect, the load transmission section may be a shock absorbing member that is attached to the one of the lattice-shaped spring member or the back face panel portion, and that absorbs impact by undergoing deformation.

In the above configuration, the shock absorbing member is squeezed between the lattice-shaped spring member and the back face panel portion and deforms (is compressed) due to the relative movement of the lattice-shaped spring member and the back face panel portion closer together during a rear collision, thereby absorbing impact. A further contribution is accordingly made to improving occupant protection performance in the event of a rear collision.

In the first aspect, the load transmission section may include a wire engagement portion that engages with the wire configuring the lattice-shaped spring member, and the load transmission section may be attached to the lattice-shaped spring member.

In the above configuration, the wire engagement portion provided at the load transmission section engages with the wire configuring the lattice-shaped spring member, thereby enabling easy attachment of the load transmission section to the lattice-shaped spring member.

In the first aspect, the load transmission section may include an engaged-with portion that is engaged by an engagement portion provided at the back face panel portion, and the load transmission section may be attached to the back face panel portion.

In the above configuration, the engagement portion provided at the back face panel portion engages with the engaged-with portion provided at the load transmission section, thereby enabling easy attachment of the load transmission section to the back face panel portion.

In the first aspect, the load transmission section may be a rib formed by a portion of the back face panel portion bulging out locally toward the seat front side.

The above configuration enables the rib that is the load transmission section to be integrally molded to the back face panel portion during molding of the seatback frame.

In the first aspect, the load transmission section may be a rib that is joined to a front face of the back face panel portion.

In the above configuration, the rib that is the load transmission section is joined to the back face panel portion of the seatback frame, enabling a configuration in which the rib is not detrimental to the formability of the seatback frame.

In the first aspect, the shock absorbing member may be formed from a softer resin than the seatback frame, may be joined to the back face panel portion at a high-strength joining portion and a low-strength joining portion having a lower joint strength than the high-strength joining portion, and may include at least one curved portion curving so as to be convex toward the seat front side, with at least one of both ends in the curve direction of the curved portion supported by the low-strength joining portion.

In the above configuration, when the at least one curved portion provided at the shock absorbing member is squeezed between the lattice-shaped spring member and the back face panel portion due to the lattice-shaped spring member and the back face panel portion moving relatively closer to each other during a rear collision, load from the seated occupant is transmitted to the back face panel portion. When the load applied to the shock absorbing member increases to a specific load or greater, the join between the low-strength joining portion of the shock absorbing member and the back face panel portion ruptures, and the support by the low-strength joining portion of the at least of both ends in the curve direction of the curved portion is released. The curved portion is accordingly squashed into a flat shape, absorbing the impact, and the back and lumbar of the seated occupant accordingly enter the seatback, and the load transmitted from the seated occupant to the back face panel portion increases. Rupturing of the join between the low-strength joining portion of the shock absorbing member and the back face panel portion enables the curved portion to be squashed into a flat shape, thereby enabling a greater entry amount of the back and lumbar of the seated occupant into the seatback to be set.

In the first aspect, the low-strength joining portion is welded to the back face panel portion at fewer weld points than the high-strength joining portion.

In the above configuration, setting the weld points at the low-strength joining portion and the high-strength joining portion of the shock absorbing member to the back face panel portion as described above enables the joint strength to be easily varied between the low-strength joining portion and the high-strength joining portion.

In the first aspect, the shock absorbing member may include a plate member that is attached to a front face of the back face panel portion in a state in which a gap is formed between the plate member and the back face panel portion; and a resilient member that is interposed in the gap between the plate member and the back face panel portion.

In the above configuration, when the lattice-shaped spring member presses the plate member toward the seat rear side through the plate member due to the lattice-shaped spring member and the back face panel portion moving relatively closer to each other during a rear collision, the resilient member between the plate member and the back face panel portion undergoes compression deformation. Impact is accordingly absorbed. This thereby enables a reaction force from the resilient member to be applied evenly across the lattice-shaped spring member due to the lattice-shaped spring member pressing the resilient member through the plate member.

A second aspect of the present invention is a vehicle seat including: a seatback frame that configures a frame of a resin-formed seatback, and that includes a plate-shaped back face panel portion disposed at a back face of the seatback; a headrest that is provided at an upper end of the seatback; a seatback pad that is provided at a front side of the seatback frame so as to form a space between the seatback pad and the back face panel portion; and a shock absorbing member that is formed from a softer resin than the seatback frame, that is disposed in the space, that is joined to the back face panel portion at a high-strength joining portion and a low-strength joining portion having a lower joint strength than the high-strength joining portion, and that includes at least one curved portion curving so as to be convex toward a seat front side, with at least one of both ends in the curve direction of the curved portion supported by the low-strength joining portion.

In the second aspect, the resin-formed seatback frame that configures the frame of the seatback includes the back face panel portion disposed at the back face of the seatback. The seatback pad is attached to the front side of the seatback frame. A space is formed between the seatback pad and the back face panel portion, and the shock absorbing member is disposed in the space. The shock absorbing member is formed from a softer resin than the seatback frame, and is joined to the back face panel portion at the high-strength joining portion and the low-strength joining portion having a lower joint strength than the high-strength joining portion, and includes the at least one curved portion curving so as to be convex toward the seat front side. The curved portion undergoes resilient deformation, thereby permitting resilient deformation of the seatback pad toward the seat rear side, enabling the comfort of a seated occupant to be secured during normal operation.

In the event of a rear collision, the seated occupant moving toward the seat rear side under inertia inputs an excess load to the seatback pad, such that the seatback pad moves relatively closer to the back face panel portion. The back and lumbar of the seated occupant can accordingly enter the seatback, thereby enabling the head of the seated occupant to be swiftly supported by the headrest. Moreover, when the at least one curved portion of the shock absorbing member are squeezed between the lattice-shaped spring member and the back face panel portion due to them moving closer as described above, load from the seated occupant is transmitted to the back face panel portion. The back and lumbar of the seated occupant are accordingly supported by the back face panel portion of the seatback frame.

When the load applied to the shock absorbing member increases to a specific load or greater, the join between the low-strength joining portion of the shock absorbing member and the back face panel portion ruptures, and the support by the low-strength joining portion at at least one of both ends in the curve direction of the curved portion is released. The curved portion is accordingly squashed into a flat shape, absorbing the impact, and the back and lumbar of the seated occupant enter further inside the seatback, and the load transmitted from the seated occupant to the back face panel portion increases. This thereby enables increased supporting force to the back and lumbar from the back face panel portion. This thereby enables an improvement in occupant protection performance in the event of a rear collision.

As described above, the vehicle seat of the present aspects contributes to an improvement in occupant protection performance in the event of a rear collision, while securing the comfort of a seated occupant during normal operation, in a configuration provided with a resin seatback frame.

BRIEF DESCRIPTION OF THE DRAWINGS

Exemplary embodiments of the present invention will be described in detail based on the following figures, wherein:

FIG. 17A is a cross-section view corresponding to FIG. 16, illustrating a state in which the lattice-shaped spring member has contacted the shock absorbing member due to load from a seated occupant during a rear collision in the vehicle seat according to the fifth exemplary embodiment;

FIG. 17B is a cross-section view corresponding to FIG. 17A, illustrating a state in which the shock absorbing member according to the fifth exemplary embodiment has been squashed by load from a seated occupant.

DETAILED DESCRIPTION

First Exemplary Embodiment

Explanation follows regarding a vehicle seat 10 according to a first exemplary embodiment, with reference to FIG. 1 to FIG. 7. In each of the drawings, the arrow FR indicates the seat front direction, the arrow UP indicates the seat upward direction, and the arrow RH indicates the seat right direction (one side in the seat width direction). The front, rear, left, right, upward, and downward directions of the vehicle seat 10 correspond to the front, rear, left, right, upward, and downward directions of the vehicle. Reference in the following explanation to the front, rear, left, right, upward, and downward directions refers to the front, rear, left, right, upward, and downward directions of the vehicle seat 10, unless specifically stated otherwise.

Figure 1:
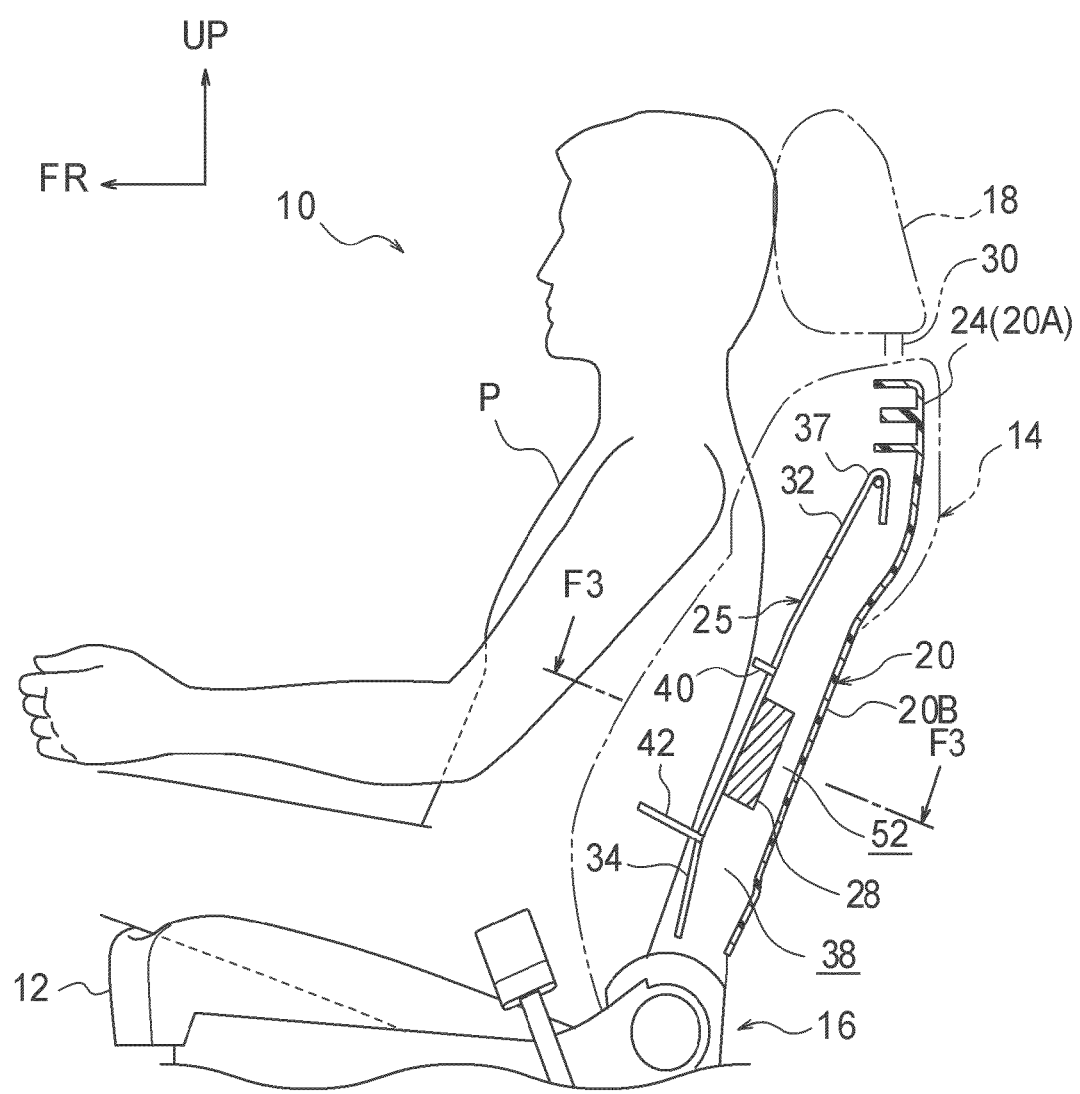
FIG. 1 is a partial cross-section view illustrating configuration of relevant portions of a vehicle seat according to a first exemplary embodiment, as viewed from the side.

As illustrated in FIG. 1, the vehicle seat 10 includes a seat cushion 12 that supports the buttocks and thighs of a seated occupant P. The seat cushion 12 is coupled to a floor (not illustrated in the drawings) of the vehicle through a known slide mechanism (not illustrated in the drawings). The vehicle seat 10 further includes a seatback 14 that supports the back of the seated occupant P. A lower end of the seatback 14 is coupled to a rear end of the seat cushion 12 through a reclining mechanism 16. An upper end of the seatback 14 is provided with a headrest 18 that supports the head of the seated occupant P.

Figure 2:
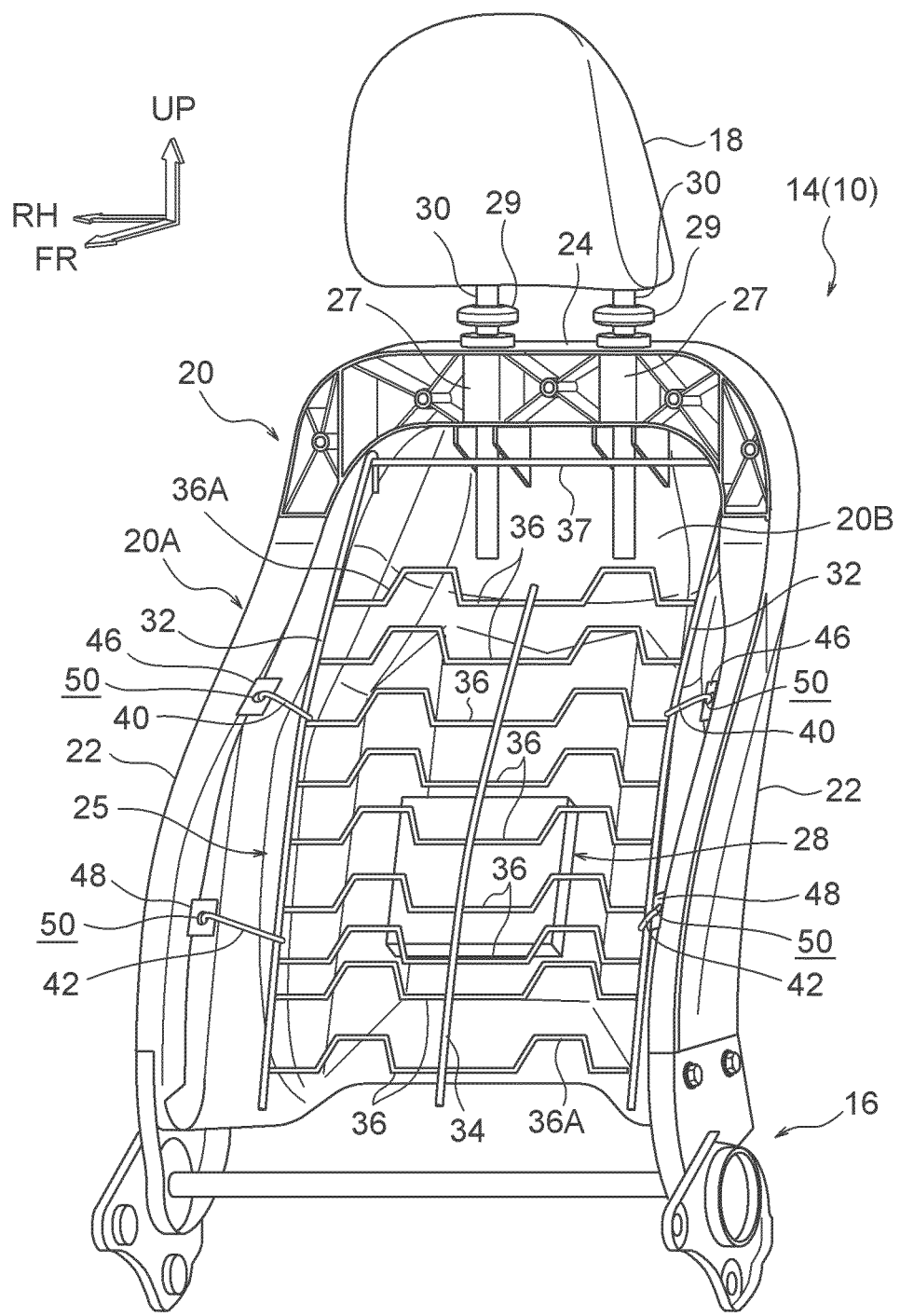
FIG. 2 is a perspective view illustrating peripheral members provided at the vehicle seat according to the first exemplary embodiment, including a seatback frame, a lattice-shaped spring member, and a shock absorbing member.
Figure 3:
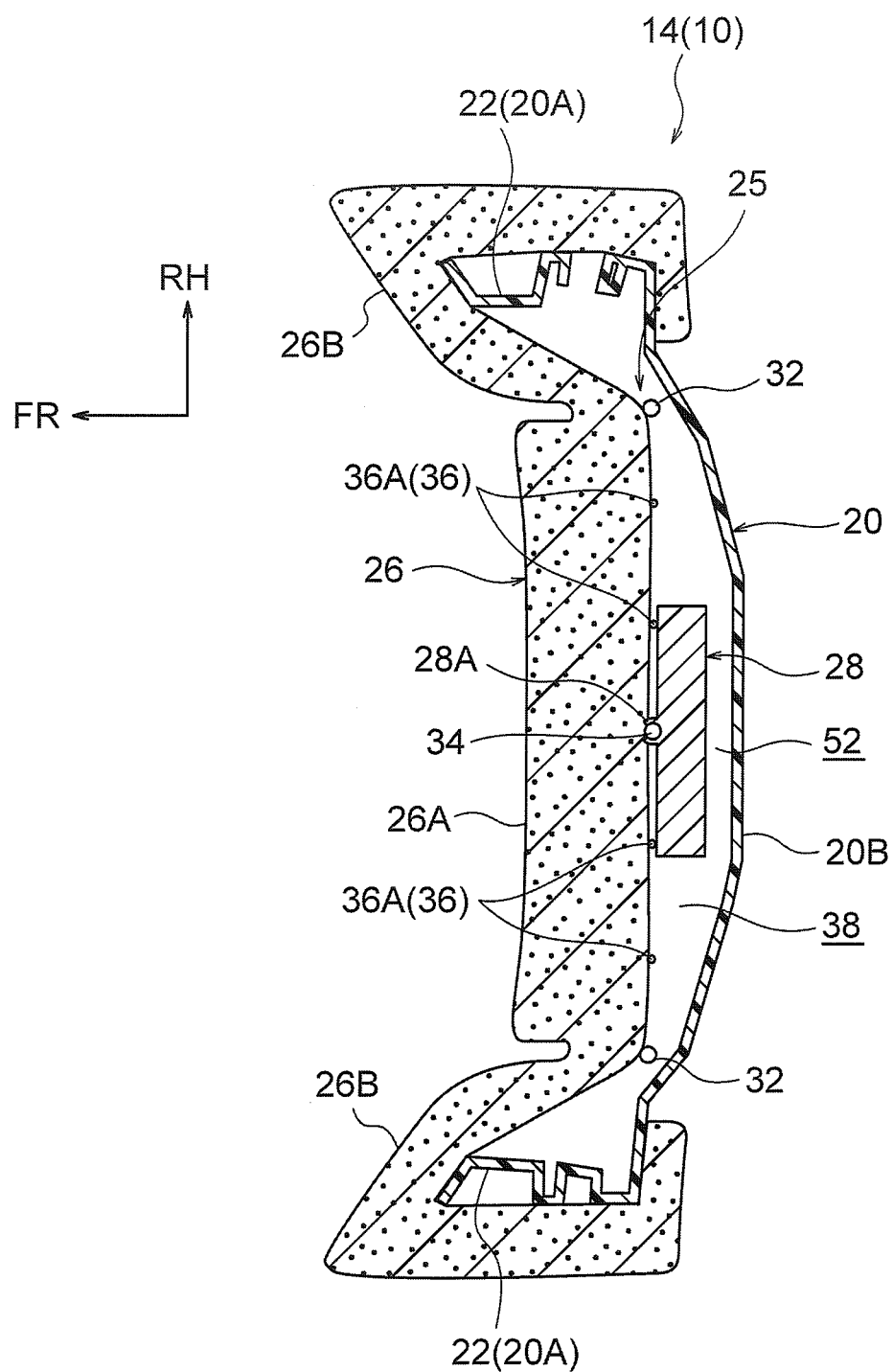
FIG. 3 is a cross-section view illustrating a cross-section taken along line F3-F3 in FIG. 1.

As illustrated in FIG. 1 to FIG. 3, the seatback 14 includes a seatback frame 20, a lattice-shaped spring member 25, a seatback pad 26 (not illustrated in the drawings except for FIG. 3), and a shock absorbing member 28 serving as a load transmission section. Detailed explanation follows regarding respective elements of the seatback 14.

Seatback Frame 20 Configuration

The seatback frame 20 configures a frame of the seatback 14, and is formed from a resin (for example, a reinforced plastic containing carbon fibers) with a shell shape overall. The seatback frame 20 is configured including an outer frame portion 20A configuring an outer peripheral portion of the seatback frame 20, and a back face panel portion 20B disposed at a rear side (back face side) of the outer frame portion 20A. The outer frame portion 20A and the back face panel portion 20B are formed integrally to each other (i.e., formed as a single continuous member).

The outer frame portion 20A is configured in an inverted substantially U-shape, open toward the seat lower side as viewed from the front. The outer frame portion 20A is configured including a pair of left and right side frame portions 22 configuring both seat width direction outside portions of the seatback frame 20, and an upper frame portion 24 configuring an upper portion of the seatback frame 20. The left and right side frame portions 22 are formed in substantially plate shapes, and extend in the seat up-down direction with their plate thickness directions extending in the seat width direction. A rear end of a seat cushion frame (not illustrated in the drawings) that is a frame member of the seat cushion 12 is coupled to lower ends of the left and right side frame portions 22 through the reclining mechanism 16.

The upper frame portion 24 extends in the seat width direction, and couples together upper ends of the left and right side frame portions 22. The upper frame portion 24 is formed with a pair of support portions 27. The support portions 27 are formed in substantially rectangular tube shapes, with their axial direction extending in the seat up-down direction. Respective headrest supports 29 are attached inside the support portions 27. A headrest frame 30 that is a frame member of the headrest 18 is mounted to the headrest supports 29. The headrest 18 is thereby coupled to the upper end of the seatback frame 20.

The back face panel portion 20B is formed in a substantially plate shape, and is disposed at a back face of the seatback 14, with its plate thickness direction extending along the seat front-rear direction. The back face panel portion 20B is formed integrally to the outer frame portion 20A, and an outer peripheral portion of the back face panel portion 20B is integrally joined to a rear end of the outer frame portion 20A. As illustrated in FIG. 3, a seat width direction central portion of the back face panel portion 20B bulges out further toward the seat rear side than both seat width direction end portions of the back face panel portion 20B. The lattice-shaped spring member 25 is disposed at the seat front side of the back face panel portion 20B.

Lattice-Shaped Spring Member 25 Configuration

The lattice-shaped spring member 25 is configured from a pair of left and right side wires 32 positioned at both sides of the seatback 14, a center cord 34 positioned at a seat width direction central portion of the seatback 14, and plural laterally strung wires 36 spanning between the left and right side wires 32. The left and right side wires 32 and the center cord 34 extend in the up-down direction, and the plural laterally strung wires 36 extend in the seatback width direction. As illustrated in FIG. 1 to FIG. 3, the lattice-shaped spring member 25 is disposed inside the seatback frame 20. A space 38 is formed between the lattice-shaped spring member 25 and the back face panel portion 20B. Note that in FIG. 1 and FIG. 4, the lattice-shaped spring member 25 and connecting wires 40, 42, described later, are illustrated schematically. In FIG. 3, the cross-sections of the side wires 32, the center cord 34, and the laterally strung wires 36 are not hatched, for the sake of clarity in the drawing.

Each of the laterally strung wires 36 are configured from spring steel wire with a smaller wire profile than the left and right side wires 32, and are disposed at intervals in the up-down direction of the lattice-shaped spring member 25. Both ends of each of the laterally strung wires 36 are fixed to the respective left and right side wires 32. The laterally strung wires 36 are each provided with formed portions 36A forming a protruding profile toward the upper side at symmetrical positions to the left and right of the center cord 34. The formed portions 36A are formed in the same plane as each other, imparting the lattice-shaped spring member 25 with a mat shape in a substantially flat plane. The formed portions 36A may also have an S-shape or a Z-shape, or the laterally strung wires 36 may have a straight profile.

Upper ends of the left and right side wires 32 are bent around in a substantially U-shape to the seat rear side and the seat lower side, and hook over a support wire 37 attached to an upper portion of the seatback frame 20. The support wire 37 extends in a straight line shape along the seat width direction. Lower ends of the left and right side wires 32 are in a free state, and are not supported by the seatback frame 20.

Upper portions and lower portions of the left and right side wires 32 are attached to the left and right side frame portions 22 using the respective connecting wires 40, 42. Specifically, the upper portions of the left and right side wires 32 are supported at the left and right side frame portions 22 using a pair of left and right upper connecting wires 40, and the lower portions of the left and right side wires 32 are supported at the left and right side frame portions 22 using a pair of left and right lower connecting wires 42.

The connecting wires 40, 42 are formed from metal wire, such as spring steel wire, with a smaller diameter than the left and right side wires 32. A pair of upper and lower attachment plates 46, 48 are provided at front ends of the left and right side frame portions 22, corresponding to the connecting wires 40, 42. Attachment holes 50 are formed in the attachment plates 46, 48, and one end (a front end) of each of the connecting wires 40, 42 is bent around in a U-shape and inserted into the respective attachment hole 50. The front ends of the connecting wires 40, 42 are thereby coupled to the left and right side frame portions 22. The other end (rear end) of each of the connecting wires 40, 42 is bent around so as to wind around the respective left or right side wire 32. The rear ends of the connecting wires 40, 42 are thereby coupled (anchored) to the left and right side wires 32.

The connecting wires 40, 42 bear tensile load when the lattice-shaped spring member 25 is applied with load toward the seat rear side. The respective connecting wires 40, 42 deform such that the bent front ends and rear ends straighten out when this tensile load exceeds a preset value. This thereby releases the coupled state between the respective connecting wires 40, 42 and the left and right side wires 32, or the coupled state between the respective connecting wires 40, 42 and the left and right side frame portions 22, releasing the coupled state of the lattice-shaped spring member 25 with respect to the left and right side frame portions 22. As a result, the lattice-shaped spring member 25 undergoes displacement toward the seat rear side (the back face panel portion 20B side) about the support wire 37 at the upper end.

Seatback Pad 26 Configuration

The seatback pad 26 is formed from a foamed member such as a urethane foam, and is attached to the seatback frame 20 from the seat front side. A front face of the seatback pad 26 is covered by a covering material, not illustrated in the drawings. The seatback pad 26 is configured from a pad main portion 26A that supports the lumbar and back of the seated occupant P, and a pair of left and right pad side portions 26B that are integrally formed at both left and right side portions of the pad main portion 26A.

The pad main portion 26A is disposed in a state contacting a front face of the lattice-shaped spring member 25, and is supported from the seat rear side by the lattice-shaped spring member 25. The left and right pad side portions 26B are formed with an open cross-section profile opening toward inside of the seat width direction, and the left and right side frame portions 22 fit inside the left and right pad side portions 26B.

Shock Absorbing Member 28 Configuration

The shock absorbing member (pressure bearing plate) 28 is formed from a material with shock absorbing properties, in a solid rectangular shape (block shape) or a plate shape with a thick plate thickness, and is provided inside the space 38 between the lattice-shaped spring member 25 and the back face panel portion 20B. The shock absorbing member 28 is positioned at a seat width direction central portion, and slightly at the lower side than a seat up-down direction central portion, of the back face of the lattice-shaped spring member 25, so that it is disposed, for example, at substantially the same height as the abdomen of the seated occupant P. The shock absorbing member 28 is set with a seat front-rear direction dimension that is smaller than its seat up-down direction dimension and seat width direction dimension. A structural member with a honeycomb structure, a urethane foam, or a speed dependent material (such as a shock absorbing nylon manufactured by Toray Industries, Inc.), for example, may be employed as the material of the shock absorbing member 28.

A front face of the shock absorbing member 28 is provided with a hook portion 28A serving as a wire engagement portion that engages with the center cord 34 of the lattice-shaped spring member 25. The hook portion 28A is formed in a hook shape with a substantially C-shaped cross-section profile open toward the seat front side as viewed along the seat up-down direction, and extends along the seat up-down direction. The center cord 34 fits inside the hook portion 28A, thereby attaching the shock absorbing member 28 to the back face of the lattice-shaped spring member 25, such that the shock absorbing member 28 projects out from the back face of the lattice-shaped spring member 25 toward the back face panel portion 20B side.

The seat up-down direction dimension of the shock absorbing member 28 is, for example, set to approximately one quarter of the seat up-down direction dimension of the lattice-shaped spring member 25. The seat width direction dimension of the shock absorbing member 28 is, for example, set to approximately one third of the seat width direction dimension of the lattice-shaped spring member 25. The seat front-rear direction dimension of the shock absorbing member 28 is set smaller than the seat front-rear direction dimension of the space 38, such that a gap 52 is formed between the shock absorbing member 28 and the back face panel portion 20B.

The seat front-rear direction dimension of the shock absorbing member 28 is set such that when the coupled state of the lattice-shaped spring member 25 to the left and right side frame portions 22 is released as described above and the lattice-shaped spring member 25 undergoes displacement toward the back face panel portion 20B side, the shock absorbing member 28 abuts the back face panel portion 20B at substantially the same time as, or before a lower end of the lattice-shaped spring member 25 abutting the back face panel portion 20B. The seat front-rear direction dimension of the shock absorbing member 28 is moreover set such that the shock absorbing member 28 does not abut the back face panel portion 20B in a state in which load from the seated occupant P is applied to the lattice-shaped spring member 25 through the seatback pad 26 during normal operation. Note that the seat up-down direction dimension and the seat width direction dimension of the shock absorbing member 28 are not limited to the above, and may be modified as appropriate.

Explanation follows regarding operation and effects of the present exemplary embodiment.

In the vehicle seat 10 configured as described above, the resin seatback frame 20 configuring the frame of the seatback 14 includes the integral outer frame portion 20A and back face panel portion 20B disposed at the back face of the seatback 14. Rigidity of the resin seatback frame 20 can be efficiently secured due to providing the back face panel portion 20B.

The lattice-shaped spring member 25 formed from wires arranged in a lattice shape is attached to the seatback frame 20, and the lattice-shaped spring member 25 supports the seatback pad 26 from the seat rear side. The space 38 is formed between the lattice-shaped spring member 25 and the back face panel portion 20B, and the shock absorbing member 28 is provided in the space 38. The shock absorbing member 28 is attached to the back face of the lattice-shaped spring member 25, projecting out toward the back face panel portion 20B side, and the gap 52 is formed between the shock absorbing member 28 and the back face panel portion 20B. The gap 52 permits resilient deformation of the lattice-shaped spring member 25 and the seatback pad 26 toward the seat rear side. This thereby enables comfort of the seated occupant P to be secured during normal operation.

In the event of a rear collision, the seated occupant P, moving toward the seat rear side under inertia, inputs an excess load to the lattice-shaped spring member 25 through the seatback pad 26. The connecting wires 40, 42 accordingly deform, releasing the coupled state of the lattice-shaped spring member 25 to the left and right side frame portions 22 of the seatback frame 20. The lattice-shaped spring member 25 undergoes displacement toward the seat rear side as a result, and the lattice-shaped spring member 25 and the back face panel portion 20B move relatively closer to each other. The back and lumbar of the seated occupant P can accordingly enter the seatback 14, thereby enabling the head of the seated occupant P to be supported swiftly by the headrest 18.

Figure 4:
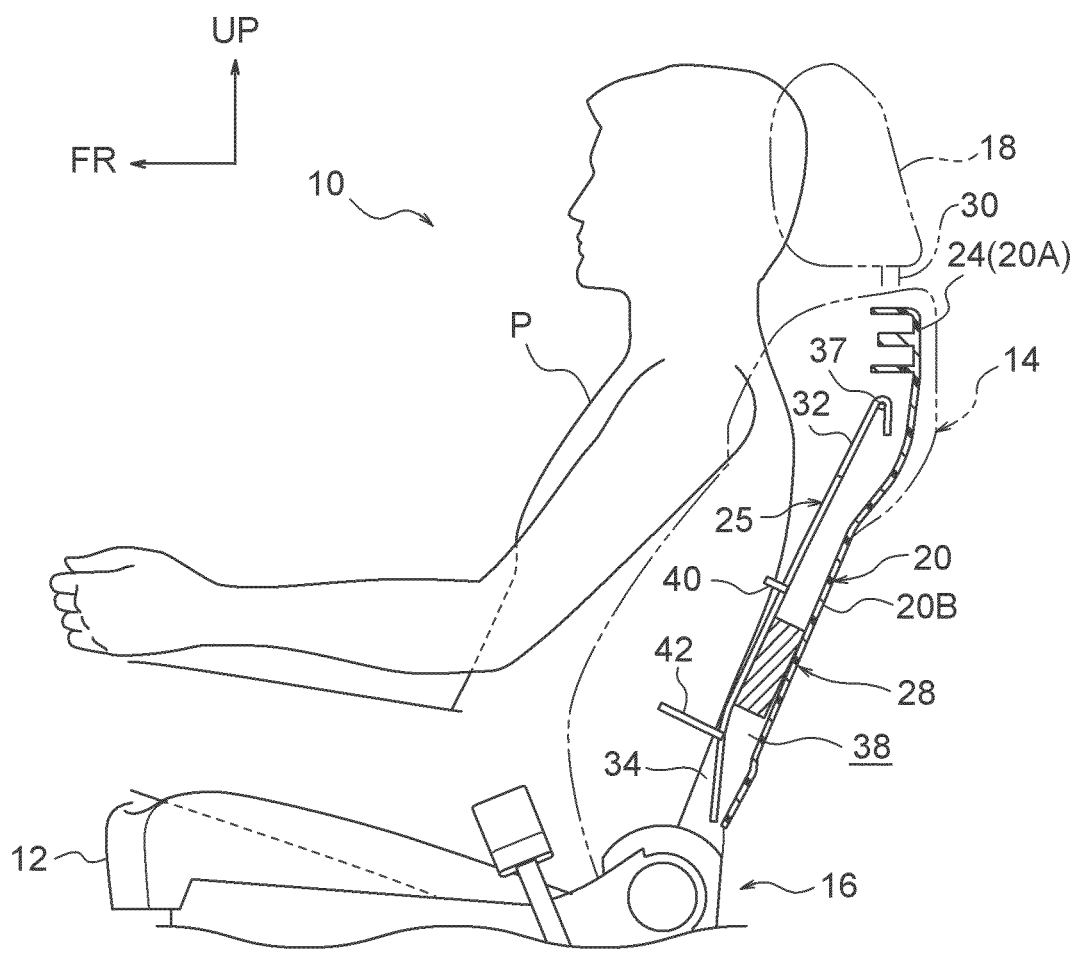
FIG. 4 is a partial cross-section view corresponding to FIG. 1, illustrating a state in which the shock absorbing member is squeezed between the lattice-shaped spring member and the back face panel portion due to a seated occupant moving under inertia in a rear collision.
Figure 5:
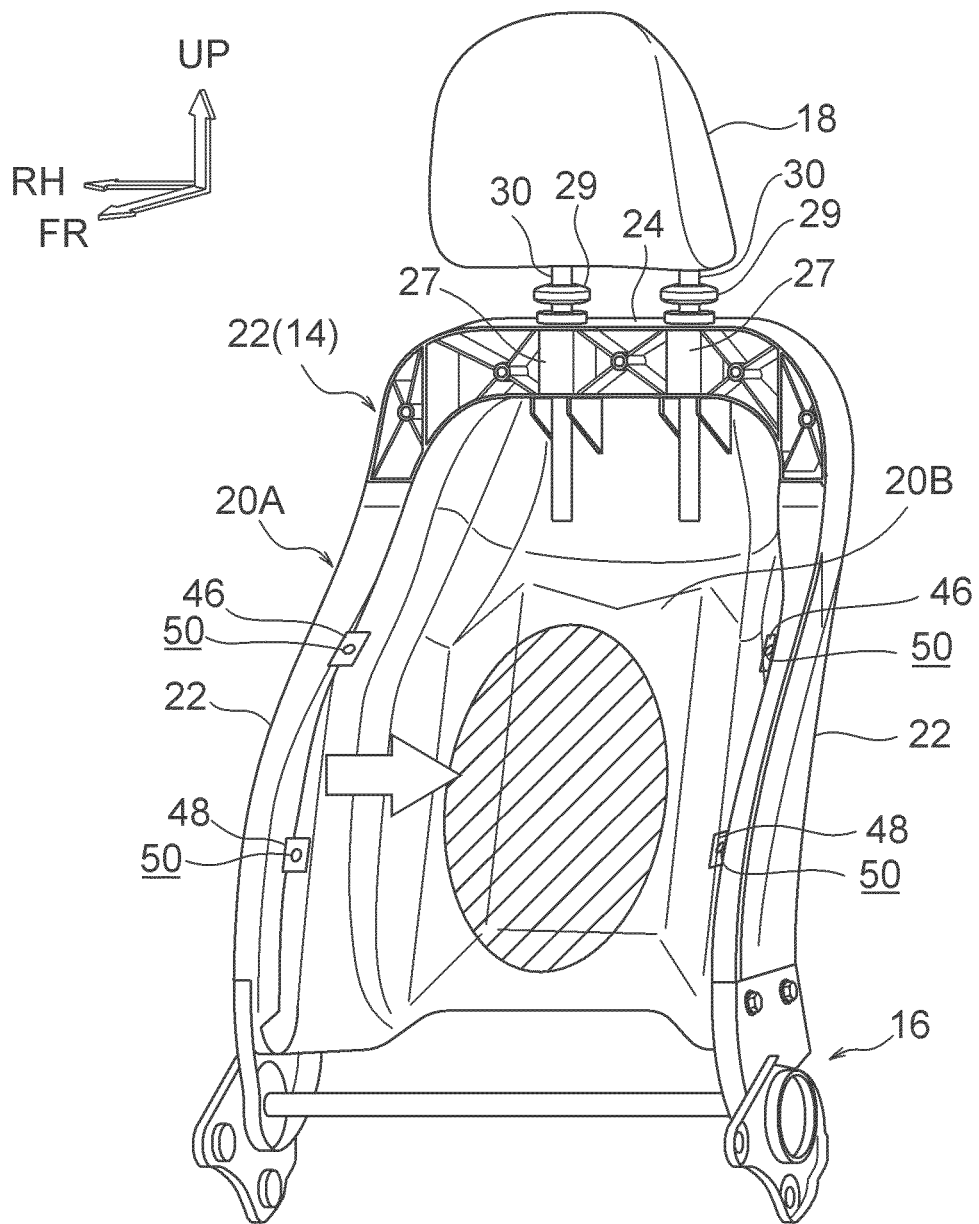
FIG. 5 is a perspective view to explain a region in a back face panel portion of the seatback frame according to the first exemplary embodiment where load is preferably transmitted from a seated occupant.

Moreover, as illustrated in FIG. 4, when the shock absorbing member 28 is squeezed between the lattice-shaped spring member 25 and the back face panel portion 20B due to them moving closer together as described above, load from the seated occupant P is transmitted to the back face panel portion 20B. This thereby enables the back face panel portion 20B of the seatback frame 20 to provide good support to the back and lumbar of the seated occupant P. This contributes to an improvement in occupant protection performance in the event of a rear collision. In order to aid explanation, in FIG. 5 hatching is applied to a region of the back face panel portion 20B where load from the seated occupant P is preferably transmitted.

Figure 6A:
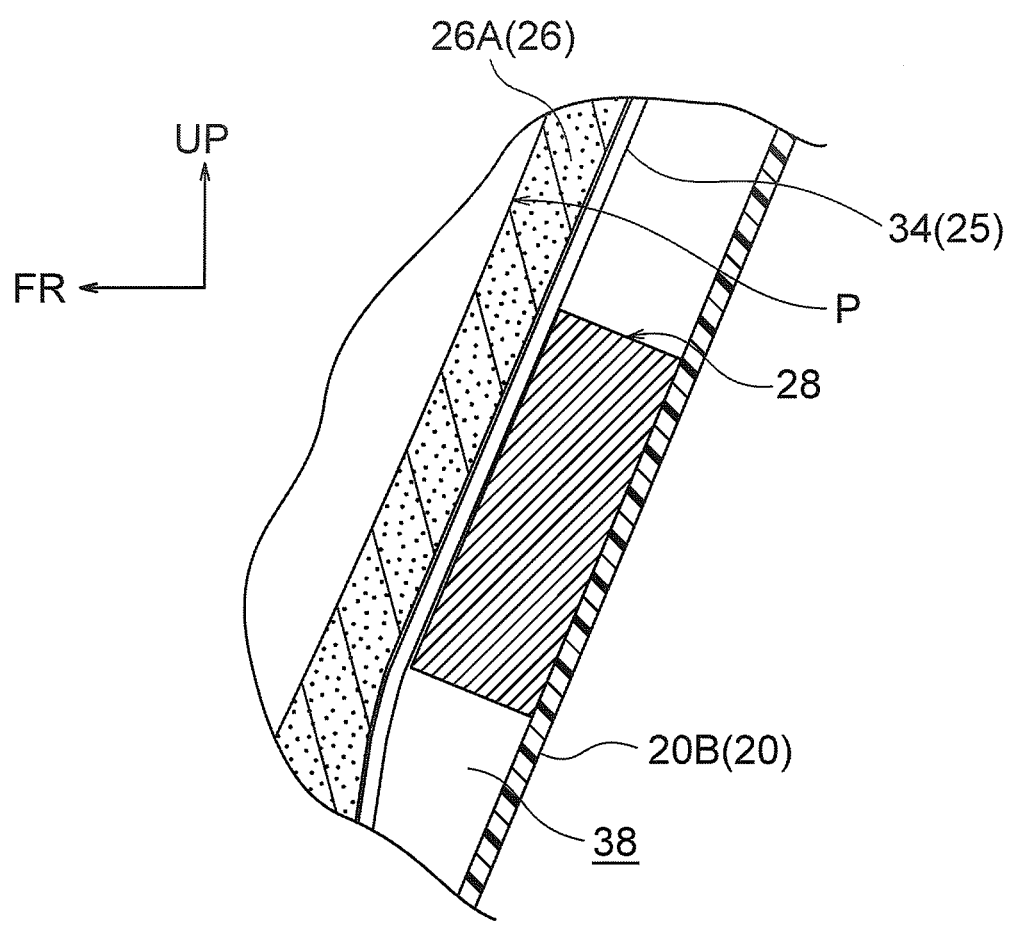
FIG. 6A is an enlarged cross-section view illustrating a portion of FIG. 4.
Figure 6B:
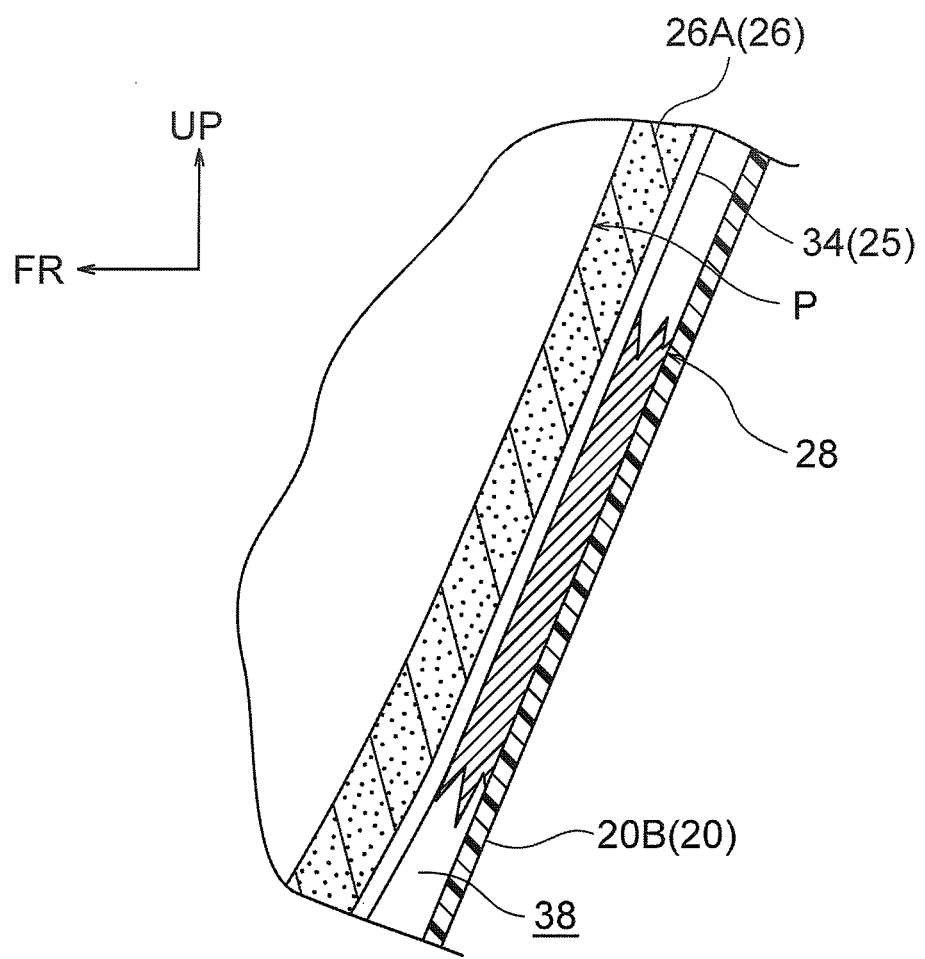
FIG. 6B is a cross-section view corresponding to FIG. 6A, illustrating a state in which the shock absorbing member has been squashed by load from a seated occupant.

The shock absorbing member 28 described above is formed from a material with shock absorbing properties. The shock absorbing member 28 (see FIG. 6A) that is squeezed between the lattice-shaped spring member 25 and the back face panel portion 20B in the event of a rear collision is accordingly squashed (undergoes compression deformation) along the seat front-rear direction on receipt of an excess load from the seated occupant P, as illustrated in FIG. 6B, thereby enabling impact to be absorbed. This makes a further contribution to the occupant protection performance in the event of a rear collision. When a speed dependent material such as that mentioned above is employed as the material for the shock absorbing member 28, the shock absorbing member 28 can be suppressed from restricting the entry of the back and lumbar of the seated occupant P into the seatback 14, thus contributing to the advantageous effect of swiftly supporting the head of the seated occupant P with the headrest 18.

Figure 7:
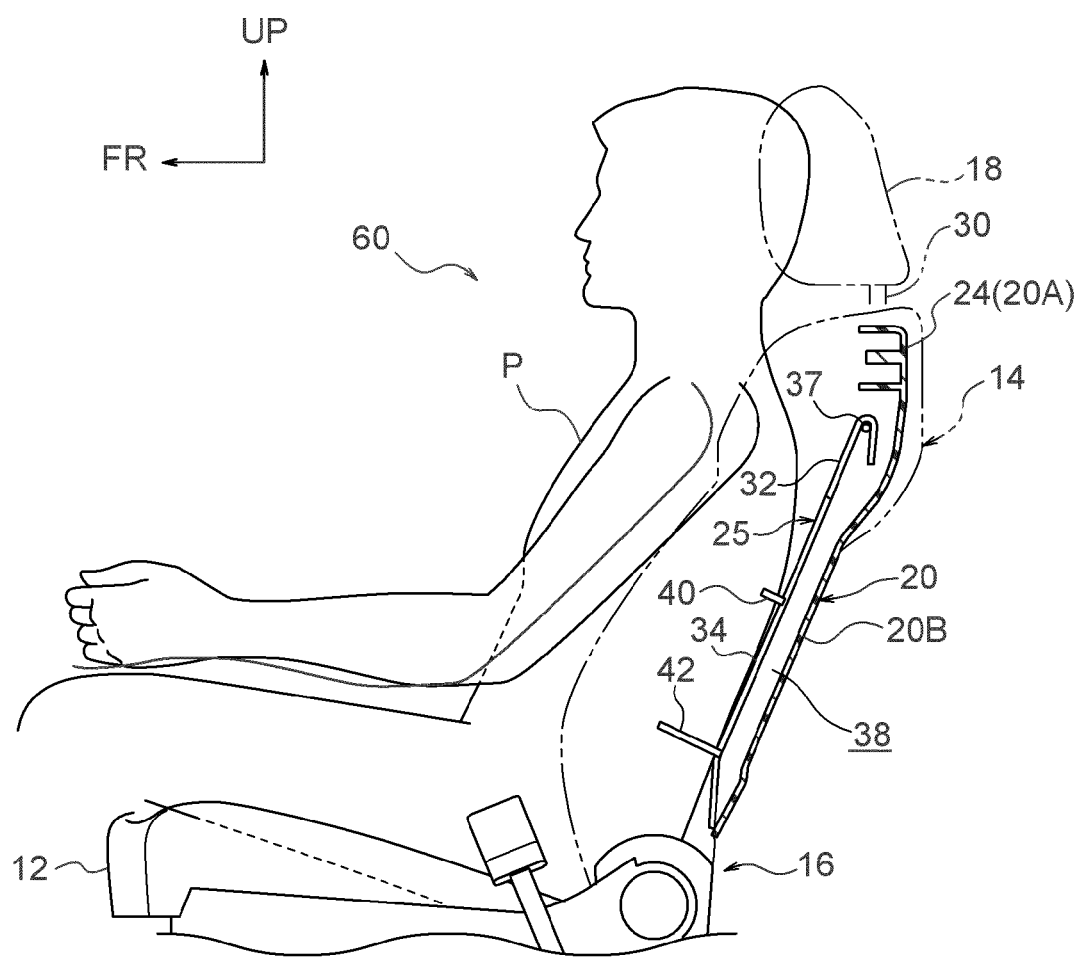
FIG. 7 is a partial cross-section view corresponding to FIG. 1, illustrating a comparative example.

Note that, as in a comparative example 60 illustrated in FIG. 7, in configurations not provided with the shock absorbing member 28, when the lattice-shaped spring member 25 undergoes displacement toward the seat rear side due to excess load from the seated occupant P, only the lower end of the lattice-shaped spring member 25 abuts the back face panel portion 20B, and load from the seated occupant P is not sufficiently transmitted to the back face panel portion 20B. It is therefore conceivable that the back and lumbar of the seated occupant P may be provided with insufficient support. Such an eventuality can be avoided in the present exemplary embodiment.

Moreover, in the present exemplary embodiment, the shock absorbing member 28 includes the hook portion 28A that engages with the center cord 34 that is one of the wires configuring the lattice-shaped spring member 25. Engaging the wire engagement portion provided at the shock absorbing member 28 with the center cord 34 during manufacture of the vehicle seat 10 enables easy attachment of the shock absorbing member 28 to the lattice-shaped spring member 25.

Next, explanation follows regarding other exemplary embodiments. Note that configurations and operation that are basically the same as those of the first exemplary embodiment are allocated the same reference numerals as in the first exemplary embodiment, and explanation thereof is omitted.

Second Exemplary Embodiment

Figure 8:
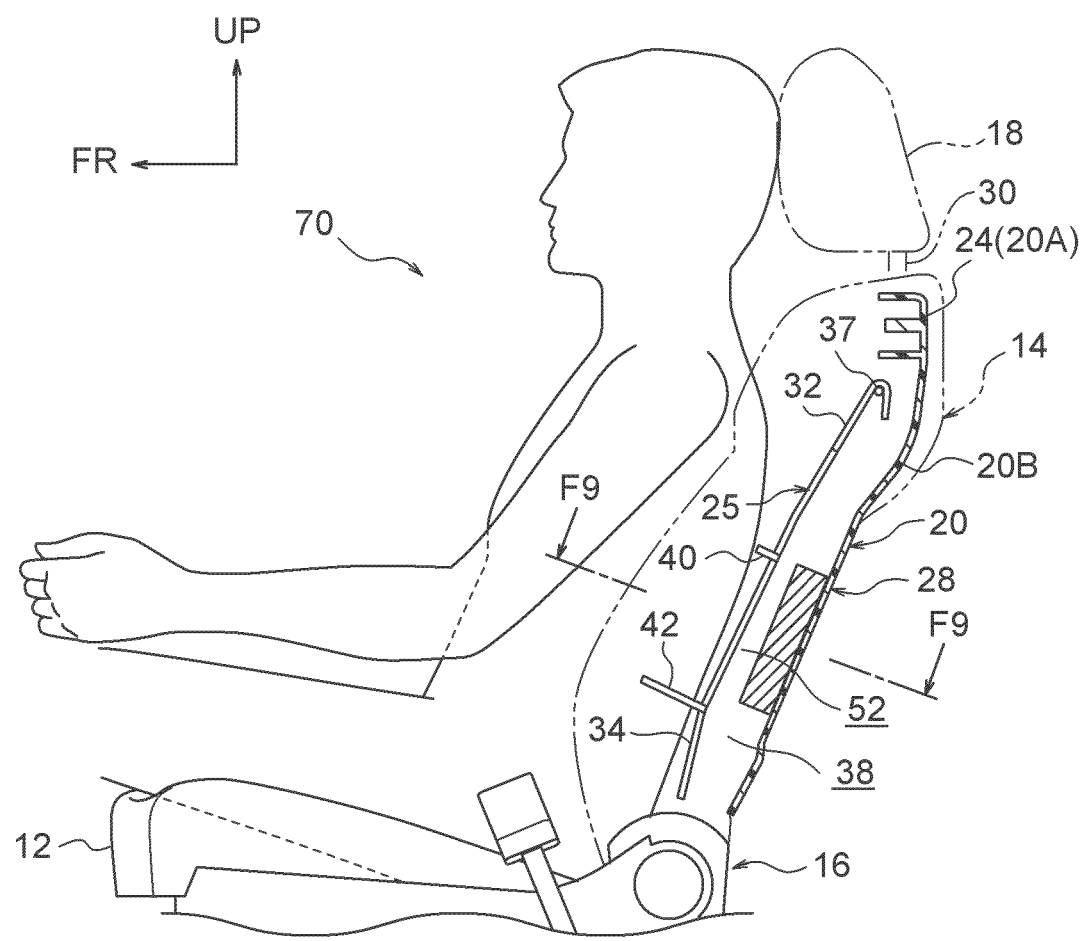
FIG. 8 is a partial cross-section view illustrating configuration of relevant portions of a vehicle seat according to a second exemplary embodiment, as viewed from the side.
Figure 9:
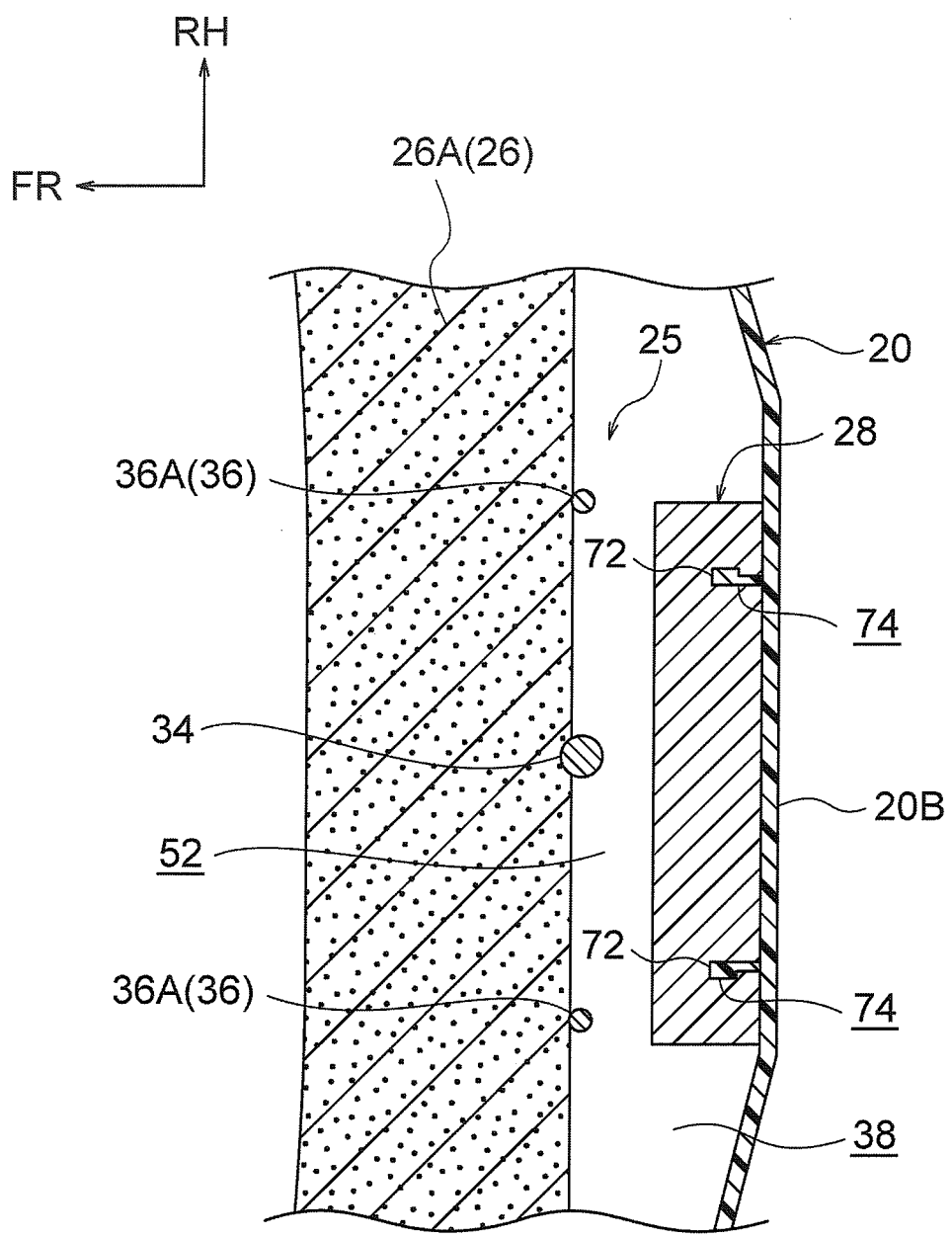
FIG. 9 is a cross-section view illustrating a cross-section taken along line F9-F9 in FIG. 8.

FIG. 8 is a partial cross-section view illustrating configuration of relevant portions of a vehicle seat 70 according to a second exemplary embodiment, as viewed from the side. FIG. 9 is a cross-section view illustrating a cross-section taken along line F9-F9 in FIG. 8. In the present exemplary embodiment, the shock absorbing member 28 is attached to the back face panel portion 20B, and the hook portion 28A of the first exemplary embodiment is omitted. Configuration is similar to that of the first exemplary embodiment in other respects.

As illustrated in FIG. 9, a pair of left and right claws 72, serving as engagement portions, are provided at a seat width direction central portion of a front face of the back face panel portion 20B. The claws 72 project out from the front face of the back face panel portion 20B toward the seat front side, and extend along the seat up-down direction. Front end sides of the claws 72 are bent toward the seat width direction outsides, and the claws 72 are each formed with a substantially L-shaped cross-section profile as viewed along the seat up-down direction.

A pair of left and right engagement grooves 74 serving as engaged-with portions are provided at a face on the back face panel portion 20B side of the shock absorbing member 28. The engagement grooves 74 extend from the upper end to the lower end of the shock absorbing member 28, and are each formed with a substantially L-shaped cross-section profile as viewed along the vehicle up-down direction, so as to correspond to the pair of claws 72. The pair of claws 72 engages (fit together in this example) with the pair of engagement grooves 74, thereby attaching the shock absorbing member 28 to the front face of the back face panel portion 20B.

Similarly to the first exemplary embodiment, the present exemplary embodiment also contributes to improving occupant protection performance in the event of a rear collision, while securing the comfort of a seated occupant during normal operation. Moreover, during manufacture of the vehicle seat 70, the shock absorbing member 28 can be easily attached to the back face panel portion 20B by engaging the pair of claws 72 provided at the back face panel portion 20B with the pair of engagement grooves 74 provided at the shock absorbing member 28.

Third Exemplary Embodiment

Figure 10:
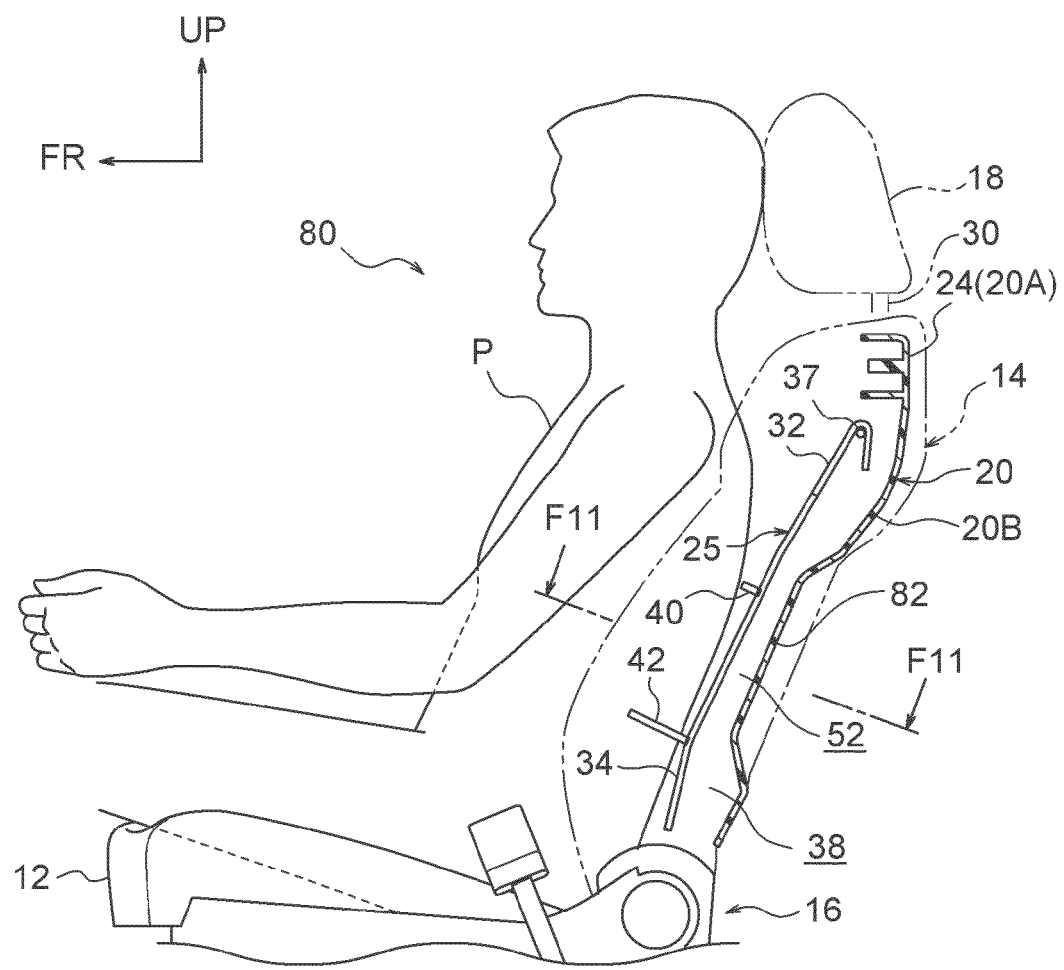
FIG. 10 is a partial cross-section view illustrating configuration of relevant portions of a vehicle seat according to a third exemplary embodiment, as viewed from the side.
Figure 11:
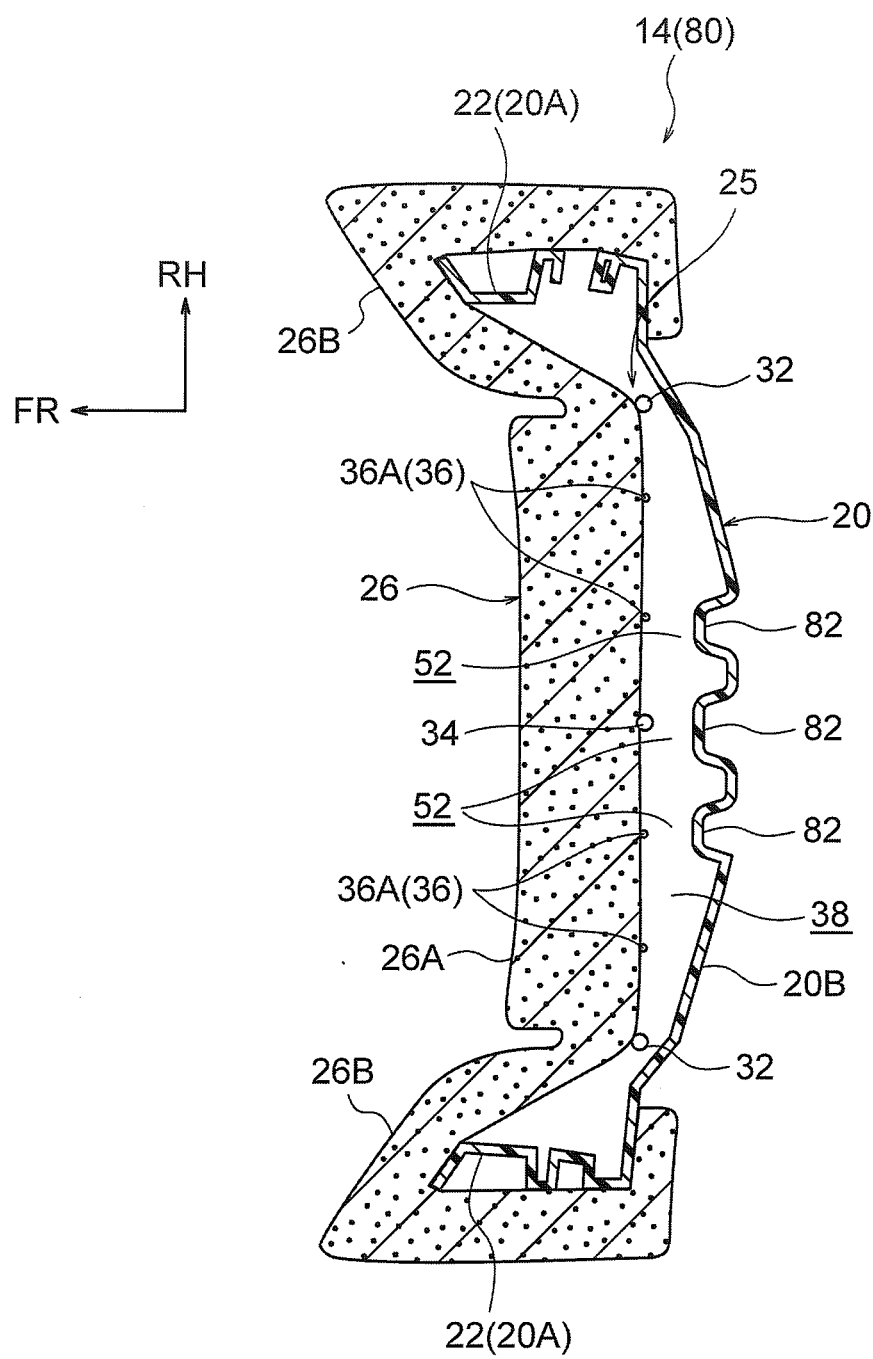
FIG. 11 is a cross-section view illustrating a cross-section taken along line F11-F11 in FIG. 10.

FIG. 10 illustrates a partial cross-section view of configuration of relevant portions of a vehicle seat 80 according to a third exemplary embodiment, as viewed from the side. FIG. 11 is a cross-section view illustrating a cross-section taken along line F11-F11 in FIG. 10. The shock absorbing member 28 according to the first exemplary embodiment is omitted in the present exemplary embodiment. In its place, plural ribs 82 (three in the present example), serving as a load transmission section, are provided at the back face panel portion 20B. The ribs 82 are formed by portions of the back face panel portion 20B bulging out toward the seat front side, and extend along the seat up-down direction at a central portion of the back face panel portion 20B, in a row along the seat width direction. The ribs 82 project out from the front face of the back face panel portion 20B toward the lattice-shaped spring member 25 side, and gaps 52 are formed between the ribs 82 and the lattice-shaped spring member 25.

The present exemplary embodiment cannot obtain the shock absorbing properties due to deformation of the shock absorbing member 28 of the first exemplary embodiment, but enables the same basic operation and advantageous effects as the first exemplary embodiment in other respects. In the present exemplary embodiment, the plural ribs 82 serving as the load transmission section can be integrally molded at the back face panel portion 20B during molding of the seatback frame 20.

Fourth Exemplary Embodiment

Figure 12:
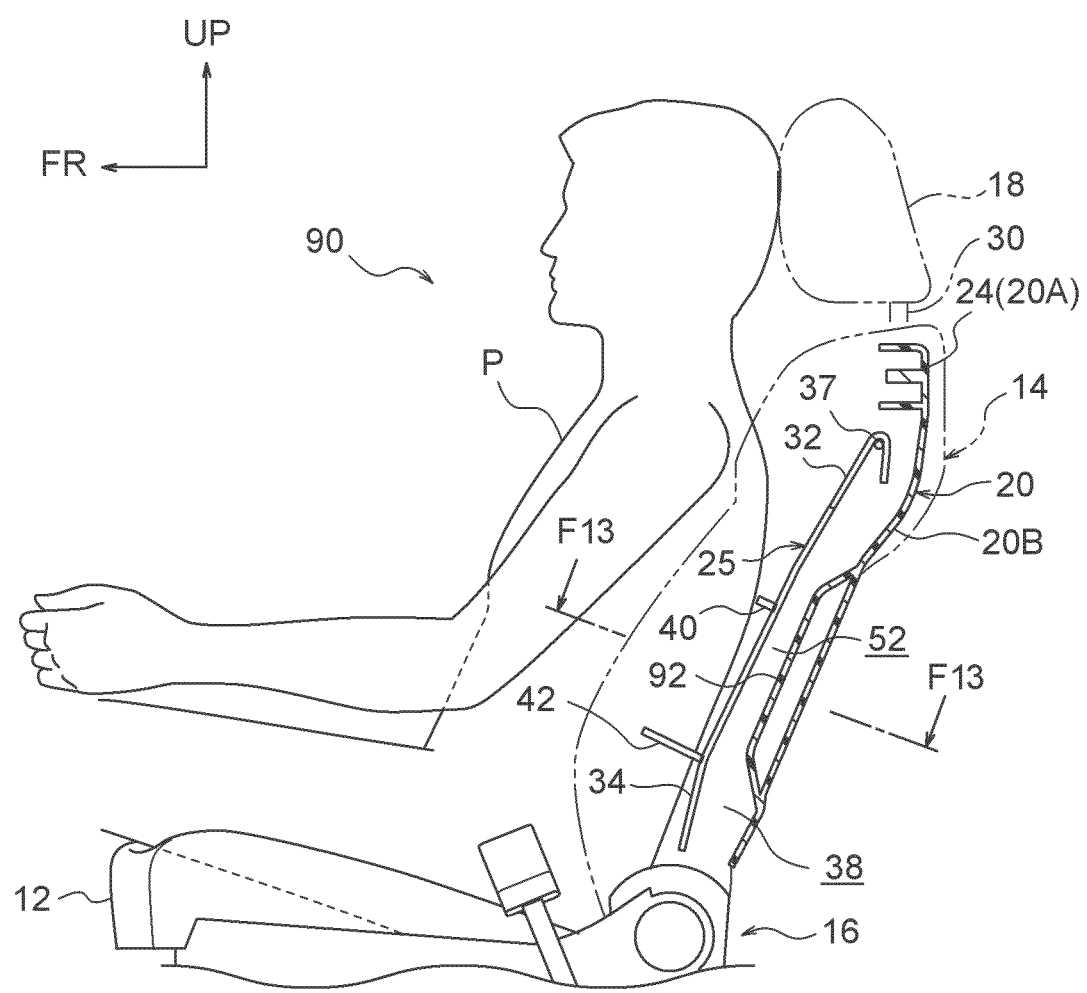
FIG. 12 is a partial cross-section view illustrating configuration of relevant portions of a vehicle seat according to a fourth exemplary embodiment, as viewed from the side.
Figure 13:
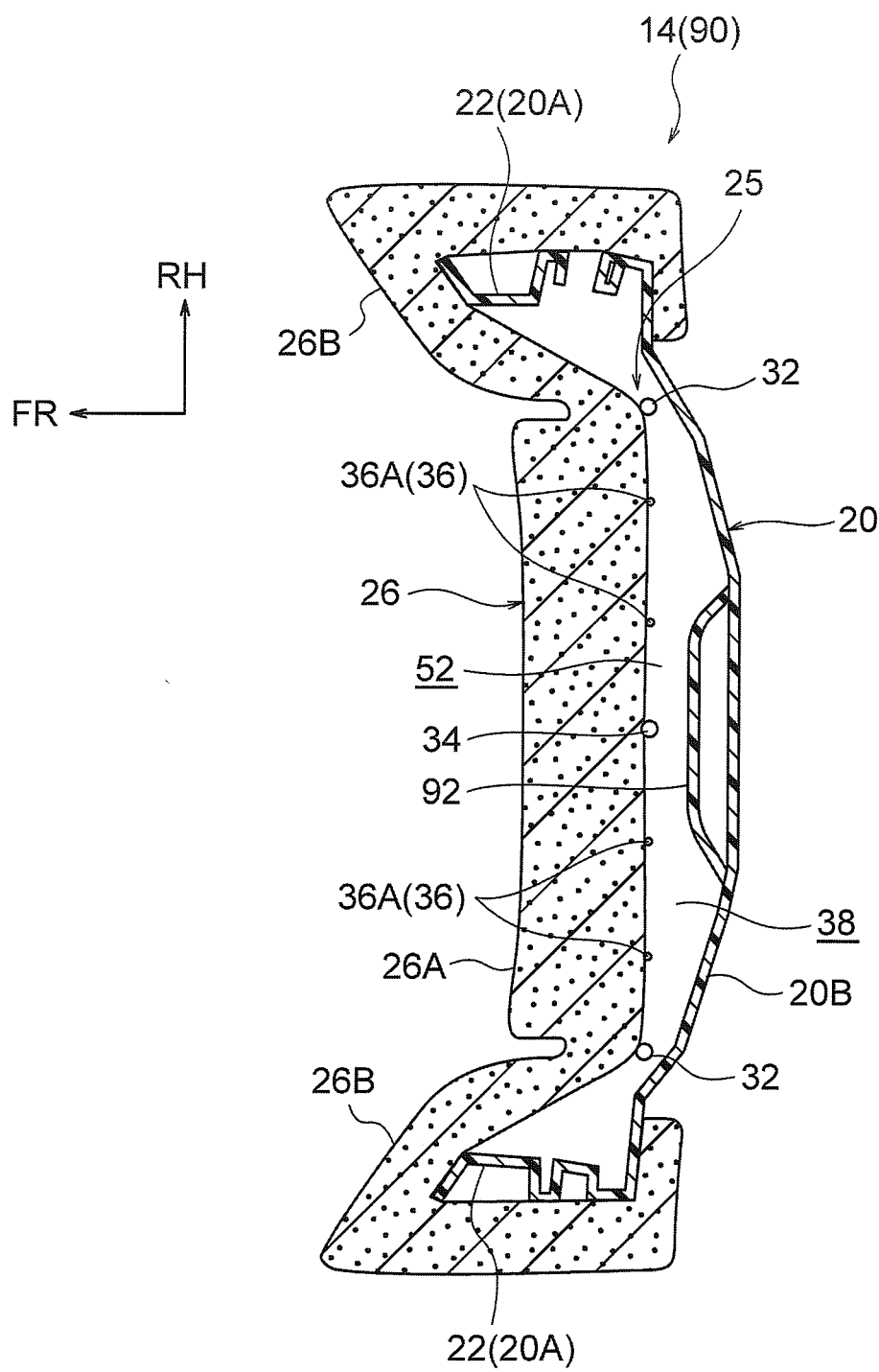
FIG. 13 is a cross-section view illustrating a cross-section taken along line F13-F13 in FIG. 12.

FIG. 12 illustrates a partial cross-section view of configuration of relevant portions of a vehicle seat 90 according to a fourth exemplary embodiment, as viewed from the side. FIG. 13 is a cross-section view illustrating a cross-section taken along line F13-F13 in FIG. 12. The shock absorbing member 28 according to the first exemplary embodiment is omitted in the present exemplary embodiment. In its place, a rib 92, serving as a load transmission section, is joined to the front face of the back face panel portion 20B. The rib 92 is formed from resin in a shallow-bottomed tray shape, with an opening facing the back face panel portion 20B side. Edges of the opening of the rib 92 are joined to the front face of the back face panel portion 20B using a means such as bonding or welding. The rib 92 projects out from the front face of the back face panel portion 20B toward the lattice-shaped spring member 25 side, and a gap 52 is formed between the rib 92 and the lattice-shaped spring member 25.

The present exemplary embodiment cannot obtain the shock absorbing properties due to deformation of the shock absorbing member 28 in the first exemplary embodiment, but enables the same basic operation and advantageous effects as the first exemplary embodiment in other respects. In the present exemplary embodiment, the rib 92 serving as the load transmission section is joined to the back face panel portion 20B, enabling a configuration in which the rib 92 is not detrimental to the formability of the seatback frame 20.

The suitability of the seatback frame 20 for common application can also be improved, since the rib 92 alone may be modified according to the vehicle model or the like.

Fifth Exemplary Embodiment

Figure 14:
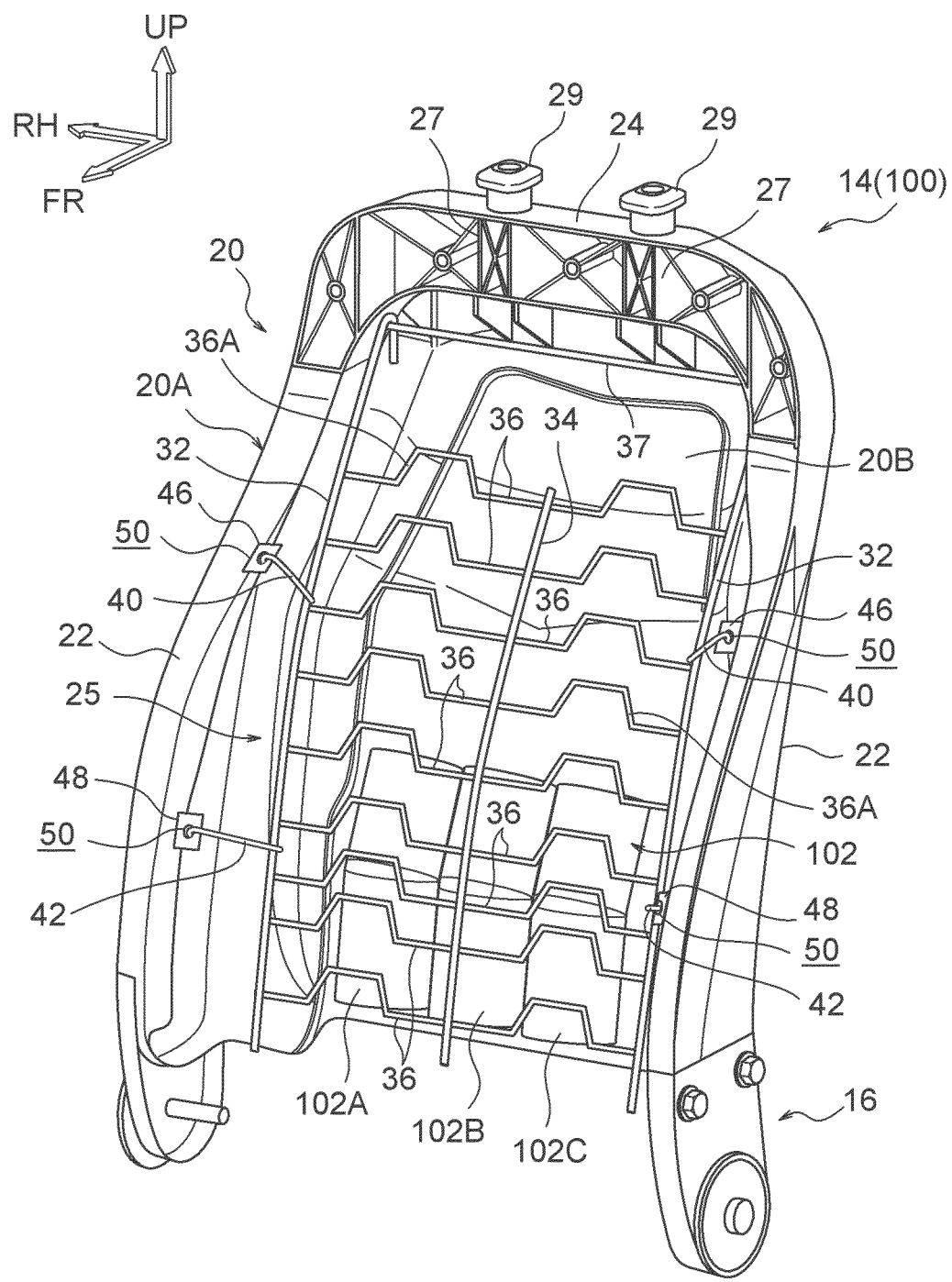
FIG. 14 is a perspective view illustrating peripheral members provided at a vehicle seat according to a fifth exemplary embodiment, including a seatback frame, a lattice-shaped spring member, and a shock absorbing member.
Figure 15:
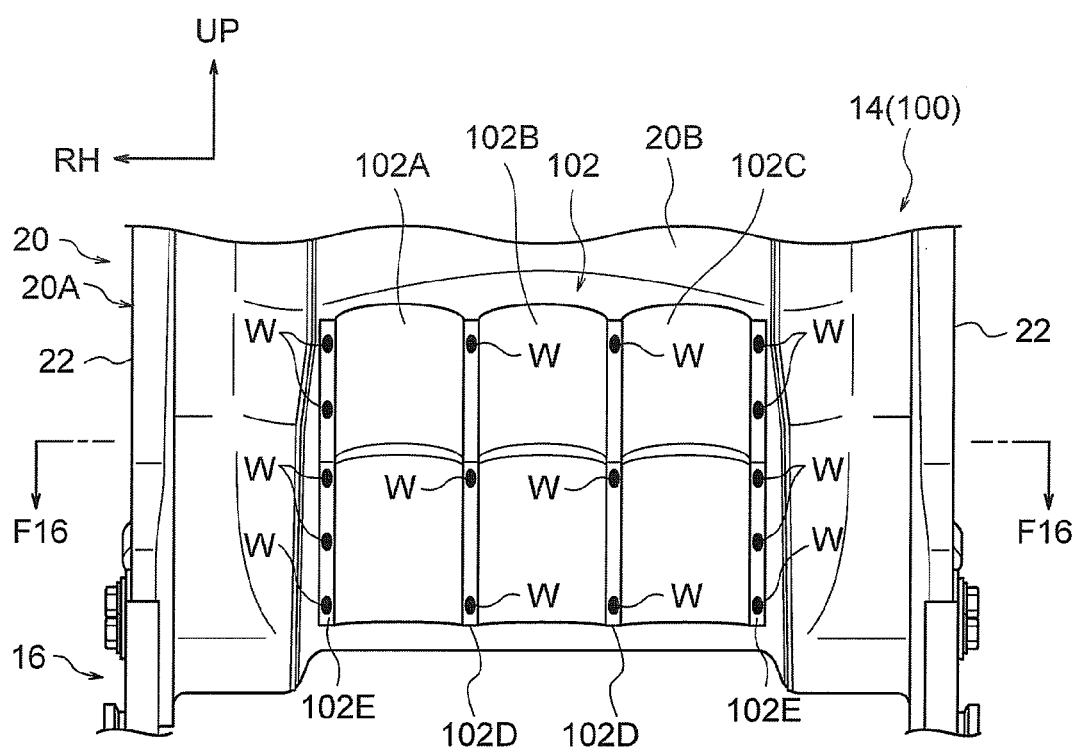
FIG. 15 is a front view of configuration peripheral to a shock absorbing member in the vehicle seat illustrated in FIG. 14, as viewed from the seat front side.
Figure 16:
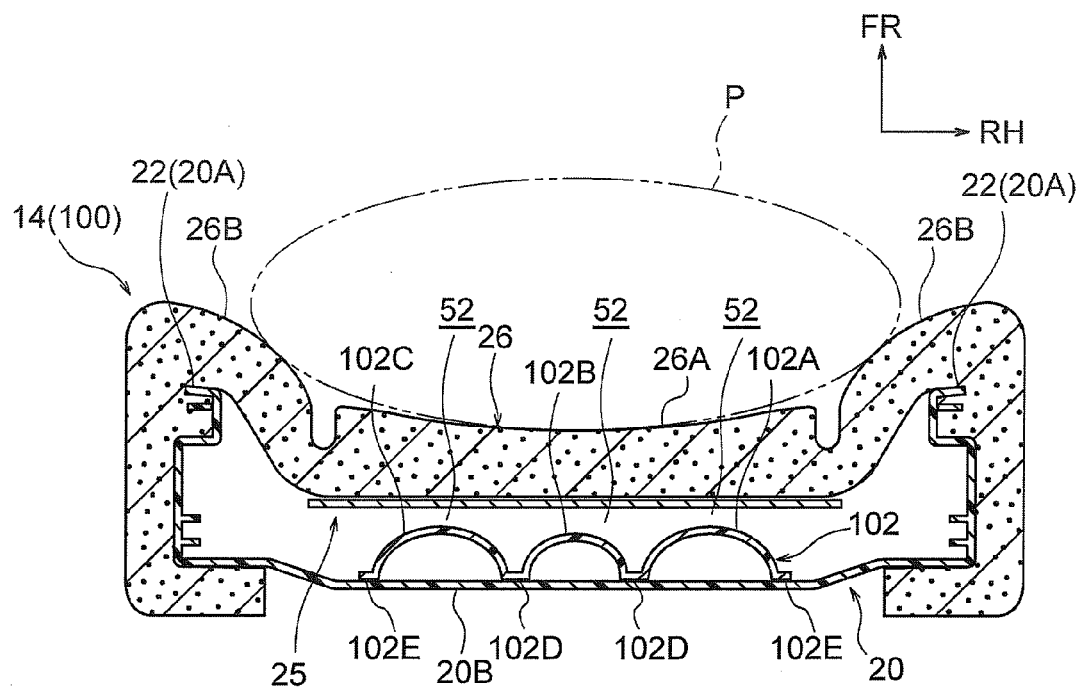
FIG. 16 is a cross-section view illustrating a cross-section taken along line F16-F16 in FIG. 15.

FIG. 14 is a perspective view illustrating configuration of peripheral members provided at a vehicle seat 100 according to a fifth exemplary embodiment, including a seatback frame 20, a lattice-shaped spring member 25, and a shock absorbing member 102. FIG. 15 is a front view of configuration peripheral to the shock absorbing member 102 of the same vehicle seat 100, as viewed from the seat front side. FIG. 16 is a cross-section view corresponding to a cross-section taken along line F16-F16 in FIG. 15. In the present exemplary embodiment, the configuration of the shock absorbing member 102 differs from that of the shock absorbing member 28 according to the first exemplary embodiment. Other configuration is similar to that of the first exemplary embodiment.

The shock absorbing member 102 is formed from a softer resin than the seatback frame 20, and is attached to a lower portion of the front face of the back face panel portion 20B. The shock absorbing member 102 includes plural (three in the present example) curved portions 102A, 102B, 102C arranged in a row along the seat width direction, along the surface of the back face panel portion 20B. The curved portions 102A, 102B, 102C curve in circular arc shapes so as to be convex toward the seat front side as viewed along the seat up-down direction. The curved portions 102A, 102C positioned on both end sides in the seat width direction, and the curved portion 102B positioned at a seat width direction central portion, are integrally connected together by respective flat plate-shaped low-strength joining portions 102D. Respective flat plate-shaped high-strength joining portions 102E are integrally provided at the curved portions 102A, 102C, these being positioned on both end sides in the seat width direction, on the sides opposite to the curved portion 102B.

Each of the low-strength joining portions 102D is welded (joined) to the front face of the back face panel portion 20B at plural weld points W (three in the present example) disposed in a row in the seat up-down direction. Each of the high-strength joining portions 102E is welded (joined) to the front face of the back face panel portion 20B at plural weld points W (five in the present example) disposed in a row in the seat up-down direction. The low-strength joining portions 102D are thereby set with a lower joint strength to the back face panel portion 20B than the high-strength joining portions 102E. One end in the curve direction (a seat width direction outside end) of each of the curved portions 102A, 102C that are positioned on both end sides in the seat width direction is supported by the corresponding high-strength joining portion 102E, and the other end in the curve direction (a seat width direction inside end) is supported by the corresponding low-strength joining portion 102D. Both ends in the curve direction (both ends in the seat width direction) of the curved portion 102B that is positioned at the seat width direction central portion are supported by the respective low-strength joining portions 102D. Namely, in the shock absorbing member 102, at least one of the two ends in the curve direction of each of the curved portions 102A, 102B, 102C is supported by the respective low-strength joining portions 102D.

The curved portions 102A, 102B, 102C project out from the back face panel portion 20B toward the seat front side, and gaps 52 are formed between the respective curved portions 102A, 102B, 102C and the lattice-shaped spring member 25 (see FIG. 16). The gaps 52 permit resilient deformation of the lattice-shaped spring member 25 and the seatback pad 26 toward the seat rear side. This thereby enables the comfort of the seated occupant P to be secured during normal operation. Note that the lattice-shaped spring member 25 is illustrated schematically in FIG. 16, FIG. 17A, and FIG. 17B.

In the event of a rear collision, an excess load from the seated occupant P moving toward the seat rear side under inertia is input to the seatback pad 26, and thereby input to the lattice-shaped spring member 25, such that the lattice-shaped spring member 25 and the back face panel portion 20B move relatively closer to each other. The back and lumbar of the seated occupant P can accordingly enter the seatback 14, thereby enabling the head of the seated occupant P to be supported swiftly by the headrest 18.

Moreover, as illustrated in FIG. 17A, when one or plural of the curved portions 102A, 102B, 102C are squeezed between the lattice-shaped spring member 25 and the back face panel portion 20B due to them moving closer as described above, load from the seated occupant P is transmitted to the back face panel portion 20B. The back and lumbar of the seated occupant P are accordingly supported by the back face panel portion 20B of the seatback frame 20.

When the load applied to the shock absorbing member 102 increases to a specific load or greater, the joins between the low-strength joining portions 102D of the shock absorbing member 102 and the back face panel portion 20B rupture, and the support by the low-strength joining portion 102D at at least one of the two curve direction ends of each of the curved portions 102A, 102B, 102C is released. Accordingly, as illustrated in FIG. 17B, the curved portions 102A, 102B, 102C are squashed into flattened shapes and absorb impact, the back and lumbar of the seated occupant P enter further inside the seatback, and the load transmitted from the seated occupant P to the back face panel portion 20B increases. This thereby enables increased supporting force from the back face panel portion 20B to the back and lumbar of the seated occupant P. This contributes to improved occupant protection performance in the event of a rear collision.

Moreover, in the present exemplary embodiment, the low-strength joining portions 102D are welded to the back face panel portion 20B at fewer weld points than the high-strength joining portions 102E. This enables the joint strength to be easily varied between the low-strength joining portions 102D and the high-strength joining portions 102E. Note that the join between the low-strength joining portions 102D and the high-strength joining portions 102E and the back face panel portion 20B is not limited to welding, and a means such as bonding may be employed.

Figure 18:
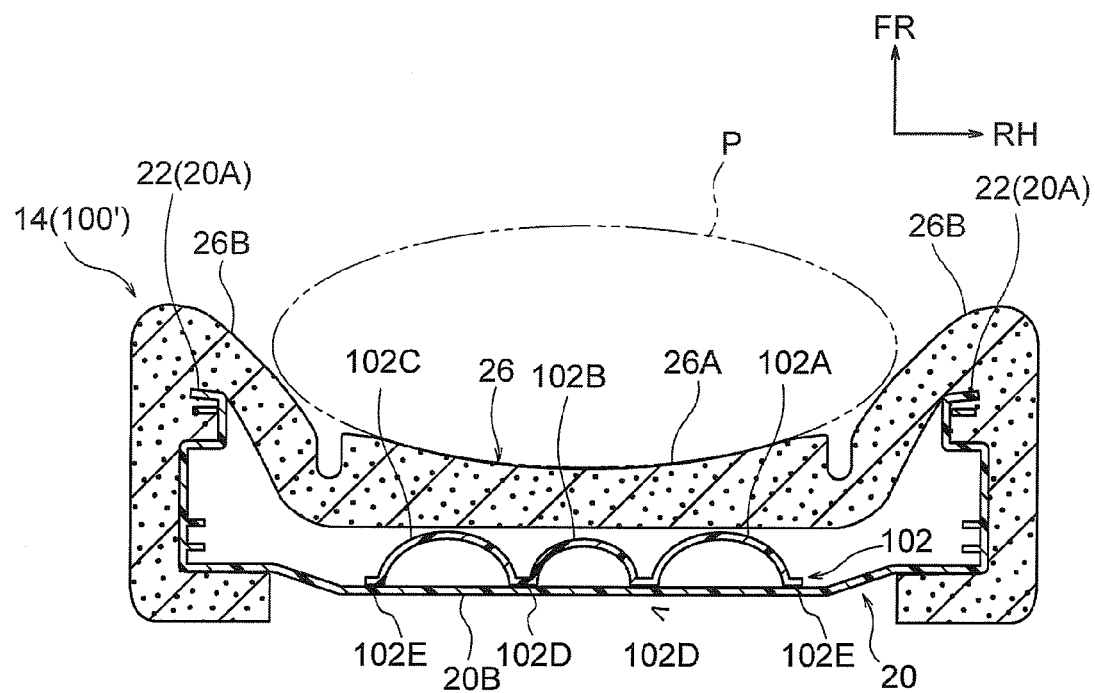
FIG. 18 is a cross-section view corresponding to FIG. 16, illustrating a modified example of the fifth exemplary embodiment.

In the fifth exemplary embodiment described above, the lattice-shaped spring member 25 may be omitted, as in the vehicle seat 100' illustrated in FIG. 18. In such a configuration, the curved portions 102A, 102B, 102C of the shock absorbing member 102 resiliently support the seatback pad 26 from the seat rear side during normal operation, thereby enabling the comfort of the seated occupant P to be secured. Omitting the lattice-shaped spring member 25 also enables a reduction in costs.

Sixth Exemplary Embodiment

Figure 19:
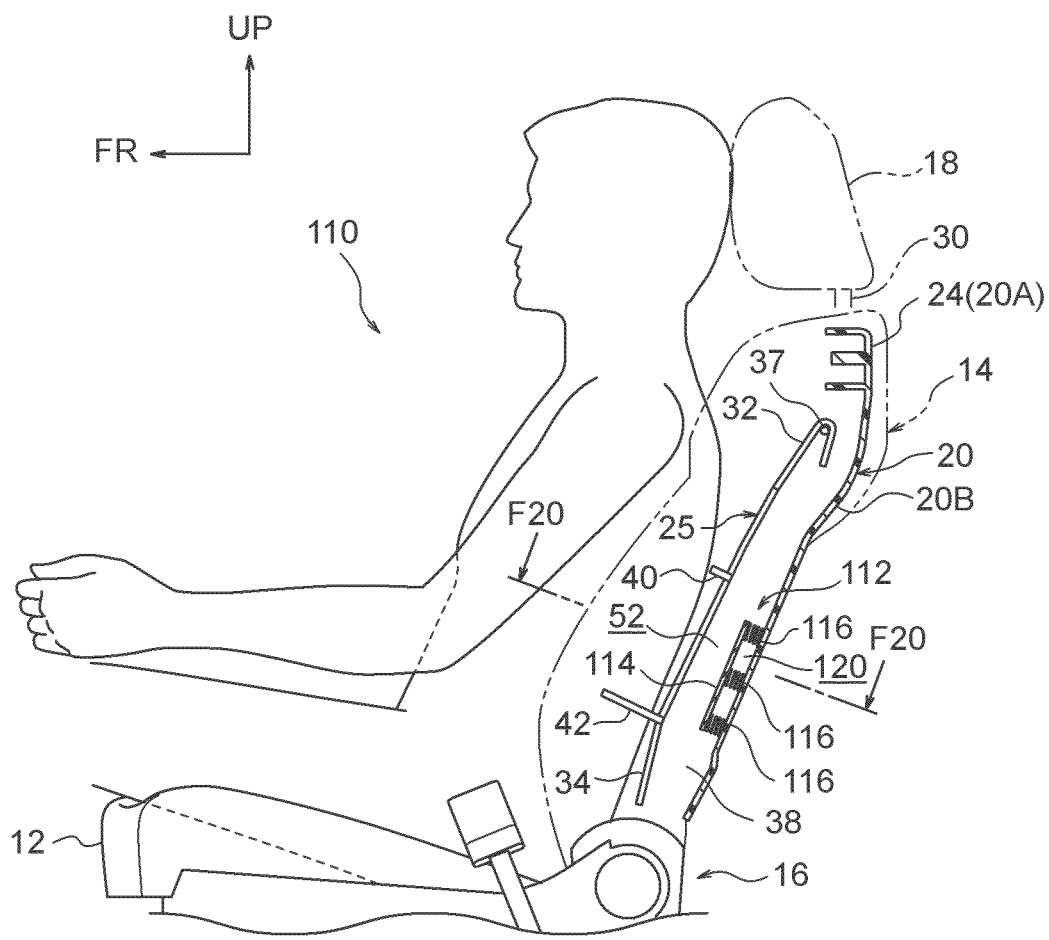
FIG. 19 is a partial cross-section view illustrating configuration of relevant portions of a vehicle seat according to a sixth exemplary embodiment, as viewed from the side.
Figure 20:
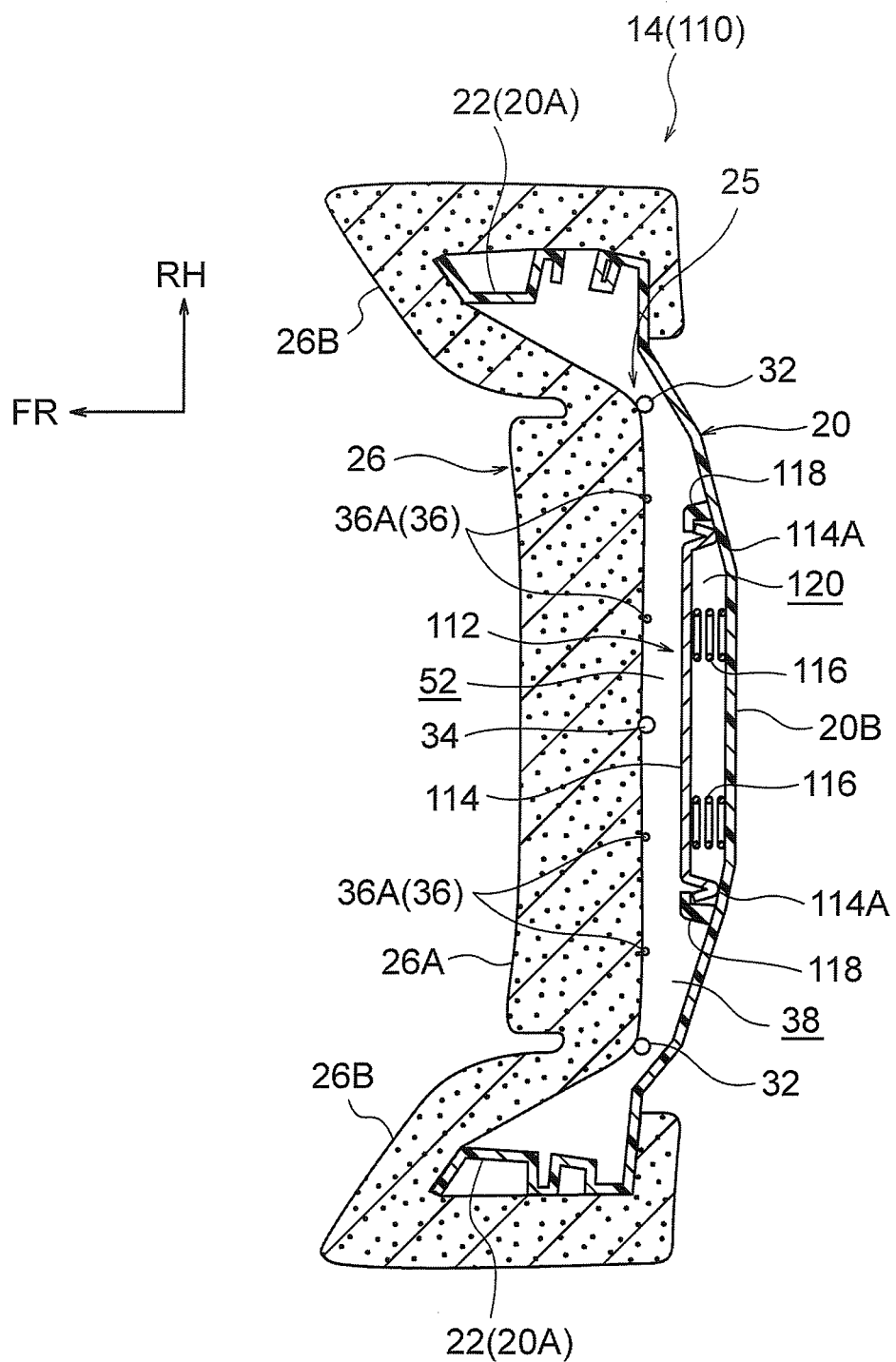
FIG. 20 is a cross-section view illustrating a cross-section taken along line F20-F20 in FIG. 19.

FIG. 19 is a partial cross-section view illustrating configuration of relevant portions of a vehicle seat 110 according to a sixth exemplary embodiment, as viewed from the side. FIG. 20 is a cross-section view illustrating a cross-section taken along line F20-F20 in FIG. 19. In the present exemplary embodiment, the shock absorbing member 28 according to the first exemplary embodiment is omitted, and a different shock absorbing member (load transmission section) 112 is provided at the front side of the back face panel portion 20B. The shock absorbing member 112 includes a plate member 114 formed in a plate shape, and plural compression coil springs 116 (six in the present example), serving as resilient members.

The plate member 114 is disposed slightly further to the lower side than a central portion of the back face panel portion 20B, and is orientated such that the plate thickness direction of the plate member 114 runs in the seat front-rear direction. The plate member 114 has a rectangular shape as viewed along the seat front-rear direction. The plate member 114 is attached to the front face of the back face panel portion 20B by fixed fitting. Namely, respective catches 114A are provided projecting out to the seat rear side and the seat width direction outsides at both seat width direction ends of the plate member 114. The catches 114A configure substantially V-shapes open toward the seat front side as viewed along the seat up-down direction. A pair of left and right claws 118 are provided at the back face panel portion 20B, corresponding to the catches 114A. The claws 118 project out toward the seat front side, and leading end sides of the claws 118 are bent toward the central side in the seat width direction. The plate member 114 is fitted in between the claws 118, and the left and right catches 114A catch on the left and right claws 118, thereby retaining the plate member 114 on the back face panel portion 20B. A gap 52 is formed between the plate member 114 and the lattice-shaped spring member 25.

A gap 120 is formed between the plate member 114 and the back face panel portion 20B, and the six compression coil springs 116 are disposed in the gap 120. The compression coil springs 116 are disposed in two rows from left to right, and three rows from top to bottom, with their axial directions along the seat front-rear direction. The compression coil springs 116 are interposed between the plate member 114 and the back face panel portion 20B. Note that a resilient member made of rubber or the like may be employed instead of the compression coil springs 116.

In the present exemplary embodiment, when the lattice-shaped spring member 25 and the back face panel portion 20B move relatively closer to each other in the event of a rear collision, the lattice-shaped spring member 25 presses the plural compression coil springs 116 toward the seat rear side through the plate member 114. The plural compression coil springs 116 between the plate member 114 and the back face panel portion 20B thereby undergo compression deformation. Impact is accordingly absorbed. This thereby enables reaction force from the plural compression coil springs 116 to be applied evenly across the lattice-shaped spring member 25 due to the lattice-shaped spring member 25 pressing the plural compression coil springs 116 through the plate member 114.

Supplementary Explanation of the Exemplary Embodiments

In each of the exemplary embodiments described above, the lattice-shaped spring member 25 is configured connected (coupled) to the left and right side frame portions 22 of the seatback frame 20 through the connecting wires 40, 42; however, there is no limitation to such exemplary embodiments. For example, configuration may be made in which connection portions (coupling portions) extending out integrally from, for example, the laterally strung wires 36 of the lattice-shaped spring member 25, are used to couple the lattice-shaped spring member 25 directly to the left and right side frame portions 22.

In each of the exemplary embodiments described above, configuration is made in which the connecting wires 40, 42 deform in the event of a rear collision in order to release the coupled state between the lattice-shaped spring member 25 and the left and right side frame portions 22 of the seatback frame 20. However, there is no limitation to such exemplary embodiments, and configuration may be made in which the coupled state between the lattice-shaped spring member 25 and the left and right side frame portions 22 is not released. For example, configuration may be made in which a lattice-shaped spring member undergoes resilient deformation toward the back face panel side in the event of a rear collision, such that a load transmission section is squeezed between the lattice-shaped spring member and the back face panel. Alternatively, for example, a connection portion (coupling portion) between the lattice-shaped spring member and the left and right side frame portions may deform and stretch such that the load transmission section is squeezed between the lattice-shaped spring member and the back face panel, while maintaining the coupled state between the lattice-shaped spring member and the seat frame.

Various modifications may be implemented within a range not departing from the spirit of the present description. Obviously the scope of rights encompassed by the present disclosure is not limited by the respective exemplary embodiments described above.

What is claimed is:

1. A vehicle seat comprising:
  a seatback frame that configures a frame of a resin-formed seatback, and that comprises a plate-shaped back face panel portion disposed at a back face of the seatback;
  a headrest that is provided at an upper end of the seatback;
  a seatback pad that is provided at a front side of the seatback frame;
  a lattice-shaped spring member that is formed from wire arranged in a lattice shape, that is attached to the seatback frame at a seat front side of the back face panel portion, and that is configured to resiliently support the seatback pad from a seat rear side, with a space formed between the back face panel portion and the lattice-shaped spring member; and
  a load transmission section that includes a first face and a second face being opposite to the first face, the load transmission section being disposed inside the space such that the first face is attached to one of the lattice-shaped spring member or the back face panel portion and the second face projects out toward the other one of the lattice-shaped spring member or the back face panel portion such that a gap is formed between the load transmission section and the other one of the lattice-shaped spring member or the back face panel portion, and such that the second face does not contact any other member in a normal operation.

2. The vehicle seat of claim 1, wherein the load transmission section is a shock absorbing member that is attached to the one of the lattice-shaped spring member or the back face panel portion, and that absorbs impact by undergoing deformation.

3. The vehicle seat of claim 1, wherein the load transmission section comprises a wire engagement portion that engages with the wire configuring the lattice-shaped spring member, and the load transmission section is attached to the lattice-shaped spring member.

* * * * *